United States Patent [19]

Magnabosco et al.

[11] Patent Number: 5,108,979

[45] Date of Patent: Apr. 28, 1992

[54] SYNTHETIC SPINELS AND PROCESSES FOR MAKING THEM

[75] Inventors: Louis M. Magnabosco, El Torro; Edward J. Demmel, Newport Beach, both of Calif.

[73] Assignee: Intercat, Inc., Sea Girt, N.J.

[21] Appl. No.: 660,808

[22] Filed: Feb. 25, 1991

[51] Int. Cl.⁵ .................. B01J 21/04; B01J 21/10; B01J 23/10; B01J 23/22
[52] U.S. Cl. .................. 502/304; 502/303; 502/306; 502/307; 502/316; 502/319; 502/324; 502/338; 502/341; 502/342; 502/524
[58] Field of Search .......... 502/303, 304, 306, 307, 502/316, 319, 324, 338, 341, 342, 524

[56] References Cited

U.S. PATENT DOCUMENTS

| | | | |
|---|---|---|---|
| 4,381,991 | 5/1983 | Bertolacini | 208/113 |
| 4,471,070 | 9/1984 | Siefert et al. | 502/302 |
| 4,492,677 | 1/1985 | Yoo et al. | 502/524 X |
| 4,728,635 | 3/1988 | Bhattacharyja et al. | 502/304 |
| 4,985,387 | 1/1991 | Prigent et al. | 502/524 X |

*Primary Examiner*—W. J. Shine
*Attorney, Agent, or Firm*—Dorr, Carson, Sloan and Peterson

[57] ABSTRACT

Spinels can be synthesized by uniformly dispersing predetermined quantities of ingredient compounds whose particles have sizes no greater than about 5 nanometers in a liquid medium, arresting the ingredient compounds in a solid matrix by spray drying said liquid medium and then calcining the resulting particles to form a solid solution of oxides of said compounds in a crystalline lattice which is substantially free of undesired complex compounds of the ingredient compounds.

92 Claims, 4 Drawing Sheets (TEST CONDUCTED BEFORE CALCINATION)

(TEST CONDUCTED AFTER CALCINATION FOR 3 HOURS AT 1350° F.)

SYNTHETIC SPINELS AND PROCESSES FOR MAKING THEM

FIELD OF THE INVENTION

This invention is generally concerned with synthetic spinel-like materials and processes for making them.

BACKGROUND OF THE INVENTION

Spinels

The term "spinel" is often employed to denote any one of a group of minerals having analogous chemical compositions which are crystallized in an isometric system with an octahedral habit. Some of the more important minerals of the spinel group are spinel, $MgAl_2O_4$, gahnite, zinc spinel, $ZnAl_2O_4$, franklinite $(Zn,Mn^{2+},Fe^{2+})(Fe^{3+},Mn^{3+})_2O_4$, and chromite, $FeCr_2O_4$. These minerals also may be thought of as combinations of bivalent and trivalent oxides of magnesium, zinc, cerium lanthanum, iron, manganese, aluminum, and chromium, having the general formula: $R^{2+}O.R_2^{3+}O_3$. Thus, for example, the bivalent oxides may be MgO, ZnO, FeO, and MnO, and the trivalent oxides may be $Al_2O_3$, $Fe_2O_3$, $Mn_2O_3$, $La_2O_3$, $Ce_2O_3$ and $Cr_2O_3$. Spinels also can be thought of as being comprised of a first metal having a first oxidation state and a second metal having an oxidation state higher than that of the first metal and wherein each metal is appropriately associated with oxygen in a spinel lattice structure. The first and second metals may be the same metal or different metals. In other words, the same metal may exist in a given spinel in two or more different oxidation states.

Looking at spinels from yet another point of view, it also could be said that they are composed of materials having variable ratios of oxides of more than one metallic element homogeneously distributed through a crystalline matrix which is held together by loose crystalline lattice bonding. Hence, the atomic ratio of the first metal to the second metal in any given spinel need not be consistent with the classical stoichiometric formula for a given natural spinel. Hence, in an even broader sense, spinels may be thought of as being composed of bivalent and trivalent metallic oxides of continuously varying proportions $nR^{2+}O.mR_2^{3+}O_3$ wherein the ratio of n to m may vary within certain ranges. The concept of "continuously variable ratios" of atoms in a material is typified by what is commonly called a "solid solution."

It has been conjectured that the distribution of elements through a spinel crystalline structure was originally achieved in nature when eutectic compositions precipitated from molten-metal oxides and aggregated as solid masses of the eutectic compositions while, usually, leaving a remainder of a single or several surplus molten oxides. Such eutectic compounds are generally combined in the proportions of small, integral atomic ratios. One such composition of particular relevance to this patent disclosure is stoichiometric spinel, a complex compound of magnesium and aluminum oxides in equal molecular proportions as the compound $Mg Al_2O_4$.

USES OF SPINELS

Spinels have been employed as catalysts in petroleum refining operations for almost 50 years. It is of considerable importance to a proper understanding of the scope of applicants' invention to also understand that petroleum industry use of spinels as catalysts has had an "up and down" evolutionary development. Originally, natural spinels were used as catalysts for catalytically cracking petroleum. They were employed because they exhibit some desirable catalytic properties. For example, they have catalytically active acid sites distributed over their extensive pore surfaces. Use of natural spinels as petroleum cracking catalysts was, however, "phased out" when the many advantages of catalytic cracking in fluidized beds of FCC ("Fluidized Catalytic Cracking") units were realized through the use of so-called MS ("micro-sphere") catalysts made of other, more catalytically active, materials.

This phasing out also followed from considerations other than catalytic cracking activity per se. For example, MS-FCC catalysts are, of necessity, spheres which must have a very narrow range of sizes for effective fluidization. Therefore, they must be synthesized with as much attention paid to size and shape as to chemical composition. That is to say that natural spinels, being of unsuitable size and shape, were easily elutriated from a fluidized bed and swept out of the catalyst inventory with off-gases and this fact caused the petroleum refining industry to employ other catalysts better suited to formulation for, and use in, FCC operations. Interest in spinels has revived, however, as environmental considerations have resulted in great incentives to find ways to employ these materials by synthesizing them in the required, MS-FCC, forms. This newfound interest in spinels follows from the fact that these materials, aside from their petroleum cracking capabilities, also are very useful as catalysts in reducing levels of those noxious sulfur oxides ($SO_x$), such as $SO_2$ and $SO_3$, which are emitted in the course of burning and/or catalyzing fossil fuels such as petroleum.

It should also be noted that, in past attempts to use $MgAl_2O_4$ synthetic spinels as $SO_x$ catalysts, the materials were, for the most part, originally formulated in aluminum-rich compositions, i.e., with an excess of aluminum oxide ($Al_2O_3$), and small amounts of the more expensive magnesium oxide, MgO ingredient commonly referred to as "magnesia." Furthermore, it should be understood that in the course of manufacturing spinels by such prior art methods, a normal, naturally spontaneous, chemical reaction quickly and readily took place wherein the complex equimolecular compound, stoichiometric spinel, $MgAl_2O_4$, was formed and left loosely distributed throughout a hard crystalline matrix of excess $Al_2O_3$. The hardness of these matrices derived from the fact that trivalent aluminum oxide, the mineral corundum (in its natural state), is extremely durable. In fact, it is next in hardness on Moh's scale only to diamond. It is also amphoteric; and, being amphoteric, it forms relatively weak bonds with sulfur and its oxides as it, in an alkaline environment, changes over to a water-soluble, basic, aluminate anion.

It was soon learned, however, that larger amounts of MgO greatly enhanced the desulfurization effectiveness of these synthetic spinel catalysts. But, when this increased activity was employed to the point of extending through the equimolecular ratio to proportions characterized by the presence of excess MgO, the result was that the normal equimolecular reaction led to production of stoichiometric spinel, $MgAl_2O_4$ which was loosely (i.e., not forming a part of a spinel's crystalline lattice) and unevenly distributed in a matrix of surplus MgO. Applicants choose to describe and characterize the MgO which is present in spinels of this kind, but which does not form a part of the spinel's crystalline lattice, by the expression "free magnesium oxide." However, regardless of the terminology used to describe them, the "hardness" of those catalysts resulting from the use of greater proportions of MgO was greatly diminished because MgO—unlike $Al_2O_3$—is far down on Moh's hardness scale. Consequently, the severe attrition and impingement encountered in fluidized beds resulted in rapid breakage and loss of those MS-FCC synthetic spinels containing significant amounts of "free magnesium oxide".

Nonetheless, all such drawbacks notwithstanding, it should be noted that any in depth review of the prior art literature reveals that a "school of thought" among many workers skilled in this art has persistently held that the presence of such complex compounds (e.g., complex metal oxides such as free magnesia, stoichiometric spinel, etc.) is an ineluctable—and even highly desirable—attribute of synthetically produced spinels (see, for example: U.S. Pat. No. 4,728,635 at column 4, line 31). Applicants, however, very decidedly belong to an opposing school of thought which holds that the presence of "free" complex metal oxides such as free magnesium oxide, is an inherently "undesirable" attribute for those spinels which are to be used as $SO_x$ catalysts. It is also a most fundamental tenet of this patent disclosure that any reactions producing complex metal compounds such stoichiometric spinel should be minimized or, if possible, completely prevented during the entire course of production of such spinels. That is to say that applicants are of the opinion that $SO_x$ catalyst performance can be enduringly enhanced when any excess magnesium oxide (amounts in "excess" of that implicit in the stoichiometric formula) is present only as a solid solution in a synthetic spinel's "magnesium rich" homogeneous crystalline structure, as opposed to its being present in the form of "free" magnesium oxide which is not so associated and distributed in a spinel's crystalline structure.

It also should be noted that applicants are of the opinion that magnesium, a divalent alkaline earth metal, will form bonds with $SO_x$ under the conditions of catalytic cracking and that these bonds, once formed, should be regarded as "permanent" at the conditions of—and hence tending to survive—normal catalyst regeneration procedures. Consequently applicants also are of the opinion that any initial $SO_x$ activity benefits which may be derived from the presence of any surplus amounts of MgO, which exists in the form of free magnesium, are soon dissipated and that spinels having such surpluses should be regarded as "unstable" i.e., characterized by rapidly diminishing $SO_x$ activity over any extended periods of use. Fortunately, applicants have found that this undesirable end result can be avoided if all magnesium oxide present in a spinel is in fact made to be an integral part of that spinel's regular crystalline lattice structure as opposed to being only loosely associated with that crystalline structure. Therefore, applicants' hereinafter described processes strive to prevent the presence of free magnesium oxide in their magnesium oxide/aluminum oxide spinels so that, among other things, it never has occasion to be converted into magnesium sulfate.

It also should be noted, however, that applicants may not be entirely alone in some of their beliefs concerning the effects resulting from the manner in which magnesium oxide is associated with a spinel's other chemical constituents. For example, U.S. Pat. No. 4,471,070 ("the 070 patent"), teaches methods of making synthetic spinels wherein the atomic ratio of magnesium to aluminum is purposely held to a range of 0.17 to 1.0 in order to enhance the spinel's $SO_x$ catalytic activity. Such ratios can imply "magnesium rich" spinels. Similarly, U.S. Pat. No. 4,728,635 ("the 635 patent"), in spite of its previously noted expression of a preference for the presence of free alkaline earth metal oxide (e.g., up to 30% of said free magnesia), also teaches methods of making spinels wherein the ratio of its alkaline earth metal to its aluminum is preferably made to fall between 0.17 and 2.5. In other words the 635 patent teaches methods for making spinels which have both "excess" magnesium oxide as part of its lattice structure while simultaneously having "free" magnesia otherwise associated with that same spinel. Such spinels also could be characterized (again, in spite of the 635 patent's stated preference for the presence of free magnesium oxide), in applicants' terminology, as "magnesium-rich" spinels if their magnesium to aluminum ratio is greater than 0.5. Conversely, if their ratio of magnesium to aluminum were less than 0.5, the resulting spinels could be characterized as "aluminum rich" spinels. There are, however, very marked differences between the processes for making spinels according to these patents and the processes employed by applicants. The precise nature of these differences will be fully discussed in later sections of this patent disclosure; but for now suffice it to say that other workers in this art have produced spinels containing "excess" magnesium.

It is also well known (see, for example, U.S. Pat. Nos. 4,469,589, 4,472,267 and 4,728,635) that certain other alkaline earth metal ions, such as calcium, strontium, barium and mixtures thereof, may replace all or a part of the magnesium ions in synthetic spinels. Similarly, it is also well known that metal ions, such as cerium, iron, chromium, vanadium, manganese, gallium, boron, cobalt, Group IB metals, Group IV metals, Group VA metals, the platinum group metals, the rare earth metals, Te, Nb, Ta, Sc, Zn, Y, Mo, W, Tl, Re, U, Th and mixtures thereof, may replace all or a part of the aluminum ions of such spinels. It might even be said that, to a very large degree, the prior art with respect to using synthetic spinels as catalysts for removing $SO_x$ has largely focused on finding ways of chemically reacting certain catalytically active materials (such as the metal ions noted above) with spinels in order to enhance their $SO_x$ capturing capabilities. It is also well known that spinels in general, and magnesium/aluminum spinels in particular, can be associated with certain metals by impregnating them with certain metal-containing solutions (e.g., those of vanadium, platinum, etc.) and then calcining the resulting product.

Finally, since the success of applicants' process is very much dependent upon the size of the chemical "particles" (including ions) undergoing chemical reaction, it should also be noted that—in general, but not in the manner taught in this patent disclosure—workers skilled in the chemical arts have long recognized that the "size" of chemical particles undergoing certain reactions can affect the outcome of those reactions, see generally: (1) C. L. M. Joyal & J. B. Butt, "Structure Sensitive Deactivation of Supported Palladium Catalysts: Carbon Monoxide Poisoning of Methylcyclo-propane Hydrogenalysis" in B. Delmon & G. F. Froment (Editors), "Catalyst Deactivation 1987, p. 545, Elsevier's Series "Studies in Surface Science & Catalysis";

(2) John B. Butt & E. E. Petersen, "Activation, Deactivation & Poisoning of Catalysts", Academic Press, 1988; and (3) James T. Richardson, "Principles of Catalyst Development", Plenum Press 1989.

METHODS OF MAKING SPINELS

It is also of some importance to this patent disclosure to realize that regardless of whether any given reference falls into the "free magnesium in a spinel is inevitable and/or desirable" school of thought or into the "free magnesium is harmful" school of thought, most successful prior art processes for synthesizing spinels employ various versions of what are commonly referred to as "gel processes." The processes taught by the 070 patent and by the 635 patent are good examples of such gel processes. These two references also are especially good comparative examples for developing the scope of applicants' patent disclosure because the processes disclosed in the 070 patent and in the 635 patent (again, notwithstanding the 635 patent's stated preference for the presence of up to 30% "free magnesia" in its resulting spinel) are apparently intended to produce spinels having a "magnesium-rich" character of the type sought by applicants in making magnesium/aluminum versions of their spinels. The spinels made by the processes of the 070 and 635 patents also provide a good basis of comparison because the spinels resulting from these two particular processes constitute some of the very best $SO_x$ catalysts the prior art has heretofore produced.

Many prior art gel reactions, e.g., the one disclosed in the 070 patent, are carried out by first making up mixtures of magnesium nitrate, $Mg(NO_3)_2$ and sodium aluminate, $NaAlO_2$. The respective hydroxides of the metals, i.e., magnesium hydroxide, $Mg(OH)_2$ and aluminum hydroxide, $Al(OH)_3$ are then precipitated from the resulting reaction mixture. Such precipitation reactions are normally carried out at a pH of from about 8.5 to about 10.5 (see, for example, paragraph 4, lines 45-47 of the 070 patent) and most preferably at the rather precise pH of 9.5 in order to induce the desired precipitation reaction. It also should be noted that most reactions of this type are produced by the addition of sodium hydroxide $Na(OH)$ to the $Mg(NO_3)_2/NaAlO_2$ mixture and that the resulting solid solution precipitates are quite viscous. Therefore, they must be filtered and washed (no matter how difficult this procedure may be) in order to remove substantially all sodium ions which are associated with the precipitate. However, assuming that such washing and filtering are done properly and completely, the magnesium-rich spinels produced by such prior art methods are generally of very high quality in terms of their $SO_x$ catalytic activities.

Unfortunately, many such prior art gel processes can only be properly and consistently carried out on a laboratory scale. That is to say that many gel processes heretofore developed are not well suited to being carried out in large scale industrial operations—or for that matter even in relatively small pilot plant operations. This inability follows from several factors. One of the most prevalent drawbacks follows from the fact that gel processes, such as the one taught in the 070 patent, require huge quantities of water in order to completely remove those remaining sodium ions which persist in their association with the hydroxide precipitates of such reactions. Failure to completely remove this sodium causes many subsequent problems which generally follow from the fact that $Na_2O$, like free $MgO$, forms a very durable sulfate bond. In other words, $Na_2SO_4$, (the mineral, "Glaubers salt"), once formed, cannot be reduced to $Na_2O$ under those conditions prevailing in a FCC reactor. Hence a spinel catalyst containing $Na_2SO_4$, just like one containing free $MgO$, will exhibit rapidly diminishing $SO_x$ catalytic activity. It also has been found that the presence of $Na_2O$ and/or $Na_2SO_4$, even at levels as low as 0.5% sodium, very significantly reduces a catalyst's ability to resist attrition as it is cycled through a FCC unit and its associated catalyst regenerator system.

Another problem generally associated with these gel processes follows from the fact that the reaction products must be filtered. Unfortunately, only very low filtration rates can be achieved owing to the particularly gelatinous nature of such gel reaction precipitates. These low filtration rates also contribute to the prohibitively high water requirements previously noted with respect to the need to completely wash away any sodium associated with the precipitates. Consequently, any filtration processes used upon these extremely viscous products are very difficult and/or expensive to carry out on a large scale basis. It also should be noted that, aside from the water requirement and filtration problems, all attempts to "force" such gel process into the context of larger scale operations have led to production of spinels which are invariably of significantly lower quality than those produced on a laboratory scale. That is to say that regardless of the precautions taken, the water volumes employed in washing, the filter changes made, etc., larger scale operations based upon such gel reactions do, in fact, permit production of complex compounds such as stoichiometric spinel and free magnesium oxide and/or the presence of sodium ions. Thus, the $SO_x$ capturing performance of synthetic spinels produced by large scale facilities attempting to carry out such gel processes is invariably unacceptably inferior to that of synthetic spinels produced in laboratory sized batches of less than a few pounds.

Over the years, the prior art has tried many avenues in seeking to successfully "scale up" various versions of such gel reactions. For example, co-mulling of various mixtures of aluminum trioxide, magnesium oxide, cerium nitrate $Ce(NO_3)_3$, cerium dioxide $CeO_2$ and vanadium pentoxide $V_2O_5$ has been tried as an adjunct preparative technique—but to no avail. Similarly, procedures which involve spray drying (see, for example, the procedures of the 635 patent) certain colloidal sols of high surface area magnesium oxide and high surface area aluminum trioxide have been tried, but, ultimately, these processes, likewise, have been abandoned because of "scale up" problems. That is to say that scale ups of these approaches (co-mulling and spray drying of sols), have resulted in $SO_x$ catalysts of unacceptable quality even though laboratory-sized versions of these processes are indeed capable of producing high quality spinels.

The failure of the prior art to produce high quality spinels by large scale gel reaction processes also follows in part from an inherent restriction of such gel processes to some rather restrictive and/or narrow pH values (especially those confined to the basic—7.0 to 14.0—part of the pH scale) in order to successfully carry out their precipitation steps. As previously noted, the gel reaction and precipitation step of the 070 patent is restricted to a 8.5 to 10.5 (and preferably to 9.5) pH range. Similarly, the gel reaction of the 635 patent is preferably carried out in the 7.0 to 10.5 pH range and more preferably will be restricted to a pH range of about 8.0 to about 9.5. Restriction to such alkalinity levels has several implications which also have an important bearing upon the teachings and import of applicants' invention. One of these implications revolves around the previously noted amphoteric nature of aluminum as a hydroxide. For example, the pH limitations of the process taught by 070 patent follow from the fact that higher pH values (e.g., above the 8.5 pH limit of the 070 patent) force a shift to a form of alkaline aluminum, i.e., the aluminate anion, $AlO_2^-$, which is soluble in water and which, therefore, is subject to being "washed out" during subsequent filtration steps. Conversely, at lower pH values (e.g., lower than the 9.5 pH limit taught by the 070 patent), hydrolysis of magnesium hydroxide will result in the formation of soluble $Mg^{2+}$ salts which likewise are subject to being washed out during filtration. In the case of the process taught by the 635 patent, a basic pH (e.g., preferably one at 9.5) is needed to form alumina particles which meet the high surface area requirements of that particular process. Hence, restrictions to narrow pH ranges in the basic region of the pH scale have been, for the most part, heretofore regarded as a necessary condition for carrying out virtually all prior art gel reaction processes.

These prior art pH limitations also imply a much more limited selection of starting materials which can be successfully employed to carry out most prior art reactions. For example, the process of the 635 requires the use of a "basic, alkaline earth metal-containing composition" (emphasis added) in order to form a suitable reaction mixture. However, certain limitations follow from this restriction. For example, even though the 635 patent teaches mixing "(1) an acidic, aluminum-containing composition in which the aluminum is present in a positively charged species, and (2) a basic, alkaline earth metal-containing composition to form a mixture", the resulting mixture is, in fact, alkaline; and consequently the ingredients of the original acidic, aluminum-containing composition are placed in an alkaline system. Again, an alkaline environment serves to produce particles having the large surface areas desired in the 635 process. However, use of this alkaline environment dictates some rather severe ingredient constraints which can be completely avoided by use of applicants' process.

For example, in the case of magnesium/aluminum spinels, applicants' process combines its aluminum-containing composition with an acidic alkaline earth metal-containing composition (as opposed to the basic alkaline earth metal-containing composition of the 635 patent) and thereby maintains its aluminum-containing composition in a resultant acidic environment which is much more favorable to the preservation of the aluminum. More important, however, is the fact that applicants' acidic environment is very conducive to the formation and preservation of those small (5 nanometer or less) particles required for the practice of the processes of this patent disclosure. In other words, the 635 patent teaches use of aluminum oxide in an alkaline medium of magnesium compounds with a view toward attaining a distinctly alkaline ionization medium whose pH is preferably held at about 9.5 and that, under such circumstances, small dispersed particles of aluminum oxide which have maximum effective surface areas are rapidly associated with water molecules and establish an equilibrium favoring the anionic form of aluminum as aluminate (i.e., $AlO_2^-$). Conversely, applicants' process is carried out in an acidic medium which results from applicants' use of salts of aluminum cations (i.e. $AlO_2^-$) and certain relatively strong anions such as acetate, nitrate, alkoxides, etc. Applicants use this acidic environment to preserve their aluminum ingredient in its metallic, cationic oxidation state. This, in turn, serves to produce a desired consistency in the dispersed alumina in say, a magnesium salt solution, so that, at the all-important moment of spray drying, applicants' particles can be transformed into a solid solution before "enclaves" of free magnesium oxide can form in the resulting spinel matrix. Applicants have also found that such an acidic environment is more conducive to use of a very broad selection of $R^{2+}$ and $R_2^{3+}$ starting materials which includes, but in no way is limited to, magnesium and aluminum.

By way of further contrast with respect to the subject of ingredient selection, it should also be understood that most prior art gel reactions are usually limited to production of spinels produced from only the hydroxides of magnesium and aluminum. It remains true, however, that all manner of other compounds of, say, magnesium and aluminum (as well as those of other metals such as zinc, iron, manganese, lanthanum, cerium, chromium) might be exploited in the manufacture of spinels if the washing and filtering steps—which are needed to remove persisting sodium ions—could be deleted from these processes for making spinels and/or if the prior art limitations to alkaline reaction systems could be obviated.

In response to all of the above noted problems and limitations (which applicants believe have a common genesis in the "inhomogeneity" of the prior art starting materials), applicants have developed a process whereby very high quality spinels—i.e., those spinels which are completely free of complex compounds such as free magnesium oxide and stoichiometric spinel, or those spinels which contain such complex compounds in concentrations as low as possible, but, in all cases, in concentrations of no more than about 5% by weight of the spinel—can be made by processes which can be successfully carried out on a large scale basis, using a wide variety of starting materials, without being plagued by the previously noted problems of restrictive pH limitations, high water demands associated with removal of sodium ions, filtration problems and those quality control problems which applicants have associated with the presence of large amounts of those undesirable materials previously noted (e.g., free magnesium oxide, stoichiometric spinel, acidic aluminum anions, and $Na_2O$). Indeed, applicants' process makes it entirely feasible to use certain combinations of starting materials which can be employed in the complete absence of many inherently undesirable materials such as sodium-containing compounds. Hence, applicants' process eliminates all of the previously noted prior art concerns for keeping $Na_2O$ and/or $Na_2SO_4$ out of a spinel. In fact, it can be said that applicants' process makes it possible for a manufacturer to concentrate almost exclusively on employing those metallic compounds which are capable of producing spinels having the most favorable $SO_x$ activity, stability, attrition resistance and ingredient costs.

It also should be emphasized that applicants' processes are entirely applicable to synthesis of synthetic spinels which can be used for purposes other than the removal of $SO_x$ from FCC units. For example, the process of this patent disclosure may well be employed in the production of other solid solution materials such as:

(1) spinels used for purposes other than as catalysts, (2) mixed oxide materials having a need for uniformity and close proximity of the constituent ingredients, (3) naphtha reforming catalysts, (4) steam, methane reforming catalysts, (5) hydrotreating and hydroprocessing catalysts, (6) dehydrogenation catalysts, (7) methane coupling catalysts, (8) oxidation catalysts, (9) oxidative dehydrogenation catalysts, (10) catalysts for oxidation of propylene, and, even, (11) materials having superconductivity capabilities.

SUMMARY OF THE INVENTION

This invention is based upon the use of certain principles and procedures for the production of "solid solution" materials and especially solid solution, catalytic materials. These principles include: (1) intimate mixing of a predetermined quantity of a first type of small particle ("small" for the purposes of this patent disclosure can be taken to mean 5 nanometers or less), and in the limiting case materials dissolved in a liquid solvent, in the presence of a predetermined quantity of a second type of "small" particle (and/or other components or ingredients which also may be present in a resulting reaction mixture), (2) maintenance of the resulting total mixture at a pH in the acidic region between about 3.5 and about 6.5, (3) rapid evaporation of the liquid solvent in order that the intimate mixing (or dissolving) of the first, second, etc. particles is preserved in a resulting solid solution of said particles, (4) as an "optional", but by no means mandatory, step, further drying the product resulting from the rapid evaporation and (5) calcining the product of the rapid evaporation. In certain special cases, which are more fully described in later portions of this patent disclosure, applicants' 5 nanometer particle size limitation can be relaxed to allow for use of certain particles of up to about 60 nanometers if some additional conditions are met. However, for now, suffice it to say that, in general, the use of ingredient particles having average diameters of less than 5 nanometers is the most general and surest way to successfully carry out the disclosed processes. Be that as it may, applicants' overall process will also sometimes include the further steps of: (a) using a third, fourth etc., species of "small" particles, (b) initially using optional ingredients which will evolve gases as a result of undergoing subsequent calcination, (c) thoroughly mixing the appropriate reactants—right up to the moment of applicants' spray drying step—in order to help preserve an intimately mixed state of the original ingredients, (d) leaching unwanted material(s) with a third component (e.g., use of so-called Raney metal production), (e) use of viscosity and/or gas evolution agents in the original reaction mixture, and (f) calcining in a manner such that all undesirable materials evolve into a gas phase.

The above-noted general principles and procedures can be employed in making a wide variety of catalysts and other materials (e.g., materials having super-conductive properties), but perhaps the most noteworthy use of the herein disclosed processes is in the production of those spinels having the general formula: $R^{2+}O.R_2^{3+}O_3$, or stated another way, $nR^{2+}O.mR_2^{3+}O_3$, wherein n and m represent numerical values, as well as spinels expressed by the formulas: $R^{2+}O(1+\alpha).R_2^{3+}O_3$ e.g., $MgO(1+\alpha).Al_2O_3$ wherein $0<\alpha<\infty$ and wherein $$\frac{n}{m} = 1 + \alpha.$$

In general, the most preferred $R^{2+}$ and $R^{3+}$ atoms for the practice of this invention are the metal atoms selected from the group consisting of magnesium, zinc, cerium, lanthanum, iron, manganese, aluminum and chromium.

With respect to the production of spinels used as $SO_x$ capturing agents, the "goal" of applicants' process is to produce spinels having less than about 5% by weight of certain so-called complex compounds (i.e., compounds formed by the union of a metal ion with a nonmetallic ion and often referred to as "coordination compounds") such as free magnesium oxide and stoichiometric spinel. More preferably applicants' spinels will have less than about 2% by weight of such complex compounds and, most preferably, the spinels made by applicants' process will have no, or at least no discernable, complex compounds of this type. Thus, for the purposes of this patent disclosure, applicants' use of expressions like: "virtually no" complex compounds in the spinel(s) or "substantially free of" such complex compounds, or expressions like spinels having "no", "small amounts", "minimal amounts", etc. of such complex compounds can be taken to mean those spinels having less than 5% by weight of such complex compounds. Stated from the other direction, it could also be said that spinels having more than 5% by weight of such materials simply do not fall within the teachings and/or spirit of this patent disclosure.

As previously noted, many views, opinions and tenets set forth by applicants are in many respects diametrically opposed to many teachings and tenets found within certain quarters of the prior art. For example, as previously noted, a most fundamental difference exists between applicants' views and those of various prior art teachings (e.g., those found in the 635 patent) regarding the "desirability" of the presence of certain complex metal oxide compounds in synthetic spinels—and especially those employed as $SO_x$ catalysts in fluid catalytic cracking units. In sharp contrast to such prior art teachings and tenets, this patent disclosure very strongly emphasizes, and teaches methods for actually obtaining, a class of synthetic spinels $R^{2+}O.R_2^{3+}O_3$ whose crystalline structures are very purposely made as free as possible from such complex metal compounds and/or from the presence of any distinct zones of unreacted surplus ingredients. In other words, the goal of applicants' process is to obtain spinels having no complex metal compounds whatsoever, but in failing to accomplish this, at least in obtaining spinels having as small concentrations of such complex metal compounds as is possible, but in no case accepting spinels having more than 5% by weight of such complex metal compounds. Again, applicants' contribution to this art is not in recognizing that complex metal compounds may constitute an "undesirable ingredient" in a spinel (the 070 patent implicitly did this), but rather in finding ways of producing such spinels (as well as other materials) without being thwarted by the host of problems which have heretofore so severely hampered and/or restricted prior art attempts to make high quality spinels on a large scale basis.

Again, even though it is used as the primary example for developing this patent disclosure, applicants' process is in no way limited to production of the spinel $MgO.Al_2O_3$. On the contrary, a wide variety of spinels $R^{2+}O.R_2^{3+}O_3$, free of, or substantially free of, any undesired and/or unintended complex compounds such as complex metal oxides, can be obtained through use of the herein disclosed processes. In other words, this patent is generally concerned with processes for producing synthetic spinels which are comprised of $R^{2+}O.R_2^{3+}O_3$ and, to the fullest extent possible (but in no case comprised of no more than 5% by weight of complex metal compounds) and nothing else, or, in some select cases, comprised of $R^{2+}O.R_2^{3+}O_3$ along with only those other select, desirable, additional components (e.g., $.R^{2+}$, $.R^{3+}$, etc. compounds wherein $.R^{2+}$, a divalent metal ion, other than $R^{2+}$, can take the place of $R^{2+}$ in the spinel's crystalline structure and/or $.R^{3+}$, a trivalent metal ion, other than $R^{3+}$, can take the place of $R^{3+}$ in the spinel's crystalline structure) which are purposely "designed" into, the synthetic spinel's structure. Thus, for example, applicants' process allows an element such as cerium to be purposely designed into, say, a magnesium/aluminum spinel's lattice structure in order to further increase its $SO_x$ catalytic activity. Consequently, even though this patent disclosure primarily uses two-metal ($R^{2+}$ and $R^{3+}$) examples to describe its synthetic spinels, such spinels can in fact contain a third (e.g., $.R^{2+}$), a fourth (e.g., $.R^{3+}$), etc., optional metal in its lattice structure as does, say, the spinel mineral franklinite $(Zn, Mn^{2+}, Fe^{2+})(Fe^{3+}, Mn^{3+})_2O_4$. The concentrations of complex compounds of such $.R^{2+}$, $.R^{3+}$ etc. ingredients should likewise—as in the case of the $R^{2+}$ and $R^{3+}$ ingredients—be held to concentrations of less than 5% of the resulting spinel.

Nonetheless, perhaps the most useful application of applicants' discovery is in producing "magnesium-rich" spinels which are especially well suited for use as $SO_x$ catalysts and which can be produced—especially on a large scale basis—in the absence of large concentrations (i.e., amounts greater than about 5% by weight) of free magnesium oxide and/or stoichiometric spinel. For the purposes of this patent disclosure the expression "large scale" can be taken to mean a batch or a production run which produces a quantity of synthetic spinel greater than about 100 pounds. In most cases, however, the expression "large scale" will, for all practical purposes, imply a quantity greater than a ton.

It should also be pointed out that, for the purposes of this patent disclosure, applicants' use of the term "magnesium-rich spinel" also should be taken to mean successful production of a homogeneous distribution of magnesium and aluminum atoms throughout such a spinel's crystalline lattice as a solid solution of continuously variable ratio (but within certain hereinafter disclosed ranges) of magnesium atoms to aluminum atoms. It should also be noted in passing that applicants' use of the expression "continuously variable" is to be contrasted with the occurrence of a "chemical reaction" of the starting ingredients to form "free $R^{2+}O$" (e.g., free magnesium oxide), along with the production of other complex compounds $R^{2+}R_2^{3+}O_4$ (e.g., stoichiometric spinel).

"Aluminum-rich" spinels may likewise be made by applicants' process, but, for the sake of consistency, "magnesium-rich" examples will be employed as a uniform example of the more general principles contained herein. Indeed, any "$R^{2+}$-rich", "$R^{3+}$-rich" etc. spinel may be so produced. Concomitantly, any "free" oxide $R^{2+}O$ (e.g., free MgO) or any other complex compound $R^{2+}R_2^{3+}O_4$ (e.g., stoichiometric spinel $Mg Al_2 O_4$) may constitute the "undesirable" compound which applicants seek to avoid, or at least minimize to a concentration of less than 5% by weight, in producing any given spinel $R^{2+}O.R_2^{3+}O_3$. In other words, the complex compounds which applicants seek to avoid should in no way be thought of as being limited to stoichiometric spinel and free magnesium oxide (in the case of production of spinel $MgO.Al_2O_3$), but rather such complex compounds may be thought of as any electrovalent and/or covalent compounds of more than one metallic (cationic) element, chemically bonded to nonmetallic (anionic) elements and/or anionic radical groupings, in the small numbers usually associated with the atomic ratios of simple inorganic compounds, which may become associated with a given spinel without becoming an integral part of its lattice structure.

APPLICANTS' PROCESS

In its most fundamental terms, applicants' process for producing synthetic spinels $R^{2+}O.R_2^{3+}O_3$ (or $nR^{2+}O.mR_2^{3+}O_3$ or $R^{2+}O(1+\alpha).R_2^{3+}O_3$ and wherein $$\frac{n}{m} = 1 + \alpha,$$

comprises: (1) mixing select compounds of $R^{2+}[A]$ (and especially a $R^{2+}[A]$ compound having a pH between about 3.5 and 6.5), $R^{3+}[B]$ (and, optionally, compounds $.R^{2+}[C]$ and/or $.R^{3+}[D]$, etc.), which compounds are usually in a suitable liquid medium such as water and wherein each such compound is comprised of units having compound "particle" sizes less than about 5 nanometers (and more preferably less than 2 nanometers and most preferably comprised of dissolved "particles") and a solvent or dispersant medium to produce a total mixture (strictly speaking, many such "mixtures" are "dispersions" and, hence, a total dispersant medium is created) having a homogeneous distribution of said compounds and a pH of about 3.5 to about 6.5; (2) volatilizing (as by spray drying) the dispersant medium (e.g., water) in order to form particles (most preferably MS particles) in which the compounds $R^{2+}[A]$, $R^{3+}[B]$ ($.R^{2+}[C]$, $.R^{3+}[D]$, etc. are "frozen" in a homogeneous distribution; and (3) calcining the particles resulting from the spray drying in order to produce crystals of a solid solution of $R^{2+}$ oxide ($R^{2+}O$). $R^{3+}$ oxide ($R_2^{3+}O_3$), etc. (i.e., producing spinel crystals having the generalized formula $R^{2+}O.R_2^{3+}O_3$) and drive off, as gases, all other elements, such as those contained in the [A], [B], ([C], [D]) components of the original ingredients and/or the components of the liquid media of the original reaction mixture, and thereby producing synthetic spinels which are substantially comprised of $R^{2+}O.R_2^{3+}O_3$ and substantially free of undesired components. Again, for the purposes of this patent disclosure, the expression "substantially free of undesired components" should be taken to mean spinels having less than 5% by weight of such materials (e.g., complex metal oxides, [A], [B] components, etc.). Spinels having less than 2% and, ultimately, those having no such undesired components are even more preferred for the purposes of producing $SO_x$ capturing agents or catalysts.

As another preferred, optional, step, the particles formed by applicants' volatilizing step also may be subjected to a separate and distinct drying (or desiccating) step in order to obtain more completely "anhydrous"

forms of the particles produced by the spray drying step—that is to say, in order to obtain materials which are "drier" than those materials obtained from the spray drying step. Such anhydrous forms are then calcined in the same manner as those products received directly from applicants' spray drying step.

As yet another particularly preferred, optional, step, one or more viscosity agents can be added to the original reaction mixture. The presence of such viscosity agents will serve to aid in "freezing" the ingredients of the homogeneous distribution present in the original mixture while they are undergoing the volatilization step. Employment of vigorous mixing action to promote a uniform distribution of the $R^{2+}[A]$, $R^{3+}[B]$, $.R^{2+}$, etc. in said liquid medium (or media) up to the time of such volatilization (e.g., by spray drying), is also a preferred adjunct to applicants' overall process. Such vigorous mixing may have even greater significance in certain "special cases" hereinafter more fully described where ingredient particles having average diameters greater than 5 nanometers may be employed.

The chemical identities, concentrations, etc. of the $R^{2+}$, $R^{3-}$, [A], [B] (and, optionally, $.R^{2+}$, $.R^{3+}$, [C], [D], etc.) ingredients, as well as the chemical identities, pH values, relative proportions, etc. of the liquid medium (and/or media) will be more fully discussed in later parts of this patent disclosure. However, before going on to such matters, some important theoretical considerations should be taken up now in order to provide a better appreciation for the full import of the teachings of this patent disclosure. One particularly useful insight into the theory behind this invention can be gained by again noting that the generalized formula $R^{2+}O.R_2^{3-}O_3$ also can be expressed by the formula $nR^{2+}O.mR_2^{3+}O_3$ wherein n and m represent numerical values, or by the formula $R^{2+}O[1+\alpha].R_2^{3-}O_3$, especially in the case wherein alpha ($\alpha$) (and wherein $$\frac{n}{m} = 1 + \alpha)$$

can be varied within certain ranges (one particularly preferred range for the practice of applicants' process is between about 0.6 and about 4.0). Thus, if n>m, this would imply an "$R^{2+}$-rich" (e.g., magnesium-rich) spinel. On the other hand if n<m this would imply an "$R^{3+}$-rich" (e.g., aluminum-rich) spinel. Consequently, for the purposes of this patent, the expressions: $R^{2+}O.R_2^{3+}O_3$, $nR^{2+}O.mR_2^{3+}O_3$ and $R^{2+}O[1+\alpha].R_2^{3+}O_3$ should be considered as being more or less synonymous. Thus, as previously noted, in the case of the spinel $MgO.Al_2O_3$, applicants' process can be employed to make an "aluminum-rich" spinel as well as a "magnesium-rich" spinel in order to, for example, take advantage of the previously noted fact that aluminum-rich spinels tend to be more attrition resistant while magnesium-rich spinels tend to be more catalytically active. Again, in most cases the most preferred starting ratio of $R^{2+}$ atoms to $R_+$ atoms to carry applicants' processes will be from about 0.5 to about 1.25. That is to say that concerns for obtaining a desired ratio of $R^{2+}$ atoms to $R_3$ atoms will, in turn, determine certain predetermined amounts of the original ingredients to be employed. Regardless of such ratios, however, applicants' main concern remains in obtaining synthetic spinels which are as free as possible from the presence of undesired complex compounds such as stoichiometric spinel and "free" surplus soft metal oxides such as free MgO.

Once having recognized that in the case of solid solutions such as these there may be variations in the formulas used in describing the structures of these spinels, one can then proceed to an even better theoretical understanding of the teachings of this patent disclosure by also appreciating the fact that formation of those complex compounds which applicants seek to avoid is usually "thermodynamically favored" unless suitable steps (such as applicants' spray drying step and/or use of viscosity agents) are taken to forestall such thermodynamically favored reactions. The term "thermodynamically favored" should be taken to mean that there will be a net loss in free energy together with a net total energy transfer which occur in changing reactant materials into the products of a given chemical reaction. Furthermore, in the course of a given chemical reaction (such as the one which takes place in the production of stoichiometric spinel), there will be a discernable transfer of energy—either absorption or liberation—which can be detected and measured.

Thus, an "accounting" of free energies can be used to predict whether or not certain reactions will take place. For example, in comparing the sum of the free energy of formation of magnesium oxide MgO and of aluminum trioxide $Al_2O_3$, in equimolecular proportions, to the free energy of the complex chemical compound stoichiometric spinel $Mg Al_2 O_4$, it will be observed that the free energy of formation of the complex compound stoichiometric spinel $Mg Al_2 O_4$ is less than the sum of the free energies of formation of MgO and of $Al_2O_3$ in their relative proportions. That is to say that should the reaction $2MgO + Al_2 O_3 \rightarrow Mg_2Al_2O_5$ lead to a result wherein the free energy of formation of $Mg_2 Al_2 O_5$ would be equal to or greater than the sum of twice the free energy of formation of MgO and the free energy of formation of aluminum trioxide $Al_2O_3$, such a compound would be thermodynamically "unfavored."

Such theoretical considerations also serve to demonstrate why, using the methods of this patent disclosure, initial mixtures of twice the number of molecules of MgO as the number of molecules of $Al_2O_3$ will not (in applicants' most preferred case) lead to formation of stoichiometric spinel with a remainder of unreacted MgO. That is to say, if permitted, the spontaneous (i.e., thermodynamically favored) reaction of such an excess of MgO normally would lead to formation of one molecule of the equimolecular complex (stoichiometric spinel) plus one molecule of free magnesium oxide MgO. Moreover, if a chemical reaction which forms stoichiometric spinel does take place, any excess MgO of the original ingredients would become "free" to migrate through the liquid phase and/or to become segregated into separate "enclaves" in the spinel's lattice structure. Any stoichiometric spinel thus produced would be similarly free to "wander" through the liquid phase. Again, these thermodynamic considerations pervade all large scale processes for the production of synthetic spinels. It should also be emphasized that the presence of any "enclaves" of complex compounds are in contradistinction to the very idea of a truly random distribution of elements such as those produced in applicants' spinel crystals wherein any deviation from a truly homogeneous scattering of $R^{2+}$ (e.g., magnesium) and $R^{3+}$ (e.g., aluminum) "nodes" through the resulting spinel's crystalline lattice is confined to dimensions of no more than a lattice spacing (a distance between two nodal atoms which form a part of the crystalline structure) order of magnitude. This criterion of success in producing applicants' spinels will be discussed more fully in subsequent sections of this patent disclosure.

In any event, applicants' process seeks to avoid, as far as possible, the above-noted thermodynamically favored reactions by "freezing" the homogeneity of the ingredient compounds, in whatever proportions, in a solid matrix before any such thermodynamically favored, inter-atomic chemical reactions can take place. In other words, applicants have found a way in which this inherent thermodynamic favoring among the chemical components in a synthetic spinel's starting mixture can be largely, or even entirely, overcome. That is to say that applicants have found that an extremely effective solution to the problems following from the above noted thermodynamic favoring lies in the conjunctive use of: (a) reaction mixture ingredients having small particle sizes, (b) use of acidic $R^{2+}$ (e.g., alkaline earth metal) compositions, (c) use of acidic total reaction mixtures, (d) fast volatilization of said total reaction mixtures and, optionally, (5) use of certain drying steps, and (6) use of certain viscosity agents. More specifically, applicants have found that if the size of the chemical units of the starting $R^{2+}[A]$ and of the $R^{3+}[B]$ (as well as any optional ingredients $.R^{2+}$, $.R^{3+}$, etc.) compounds is kept to less than about 5 nanometers and more preferably kept to less than about 2 nanometers (again, such size limitations are included in the case where such particles are dissolved into true solutions comprised of ions of the particle's constituent chemicals), and the other conditions are met, the previously discussed thermodynamically favored reactions can be avoided until the ingredients are "safely" frozen into a homogeneous distribution by applicants' volatilization step. With respect to applicants' particle size limitation, it should also be noted that the use of true solutions, i.e., uniformly dispersed mixtures, at the molecular or ionic level, of one or more such substances, e.g., $R^{2+}[A]$ and $R^{3+}[B]$, (the solute) in one or more other substances (the solvent such as a "liquid media") is often the most preferred state with respect to ingredient "particle" size. It should also be noted in passing that when applicants compositions take the form of a colloidal sol, their solid and liquid components may be referred to as "phase(s)" of the sol (a dispersion) and, hence, the expressions "phase" and/or "phases" also may be employed to express certain concepts relevant to this patent disclosure.

Stated from the opposite direction, applicants have found that—except for some special cases hereinafter more fully described—at ingredient particle sizes greater than about 5 nanometers, there is discernable evidence (e.g., thermodynamic, x-ray diffraction and micro-quantitative analytical) of the occurrence of those undesired chemical reactions which serve to produce complex compounds (such as complex metal oxides) in a synthetic spinel's lattice structure and which applicants' process seeks to avoid. Hence, the most fundamental tenet of this patent disclosure is that the criterion of ingredient particle size (again, the expression "particle" should be taken to include crystals, molecules, and/or ions) must be imposed from the very start of applicants' production process in order to insure success in obtaining favorable results throughout the remaining steps of said process. If applicants' particle size limitations are not met, or if the "special case", crystalline structure and size limitations described in the next few paragraphs are not present, then use of the other limitations regarding pH of the ingredients and/or total mixture, rapid volatilization, calcination, etc., will not produce spinels which are substantially free of undesired complex compounds.

Before leaving the subject of applicants' 5 nanometer particle size limitation, however, it now should be specifically noted that there can be some "special cases" or "exceptions", or apparent exceptions (e.g., those generated by use of differing test methods or test conditions), to applicants' otherwise strict rule against using ingredient particles larger than 5 nanometers. These exceptions emanate from three general considerations. First, the point in applicants' overall process where their 5 nanometer particle size limitation is of the utmost importance is that moment when the spray drying step is initiated. It is of course much more practical to measure particles when they are in a dry state. Consequently, most of this patent disclosure is couched in terms of the sizes of the original ingredient particles—rather than in terms of the sizes of the particles in a dispersion just as the dispersion undergoes spray drying. Second, the "shape" of a given particle may have some influence on applicants' particle size limitations and, in turn, a particle's shape can be related to the lattice spacings between the atoms which make up the crystalline structure of that particle. Finally, it should at least be noted in passing that different workers in this art may report different particle sizes for presumably "the same" species of particles depending upon the measurement methods employed.

In any event, and in spite of their opting to emphasize measurements applied to "dry" particles, applicants' studies have confirmed that the most critical point for applying their 5 nanometer particle size limitation is at that moment when the spray drying step commences converting the total reaction mixture (e.g., a magnesia/alumina/water/acid dispersion) into a solid material. Consequently, particles introduced into applicants' reaction mixture may, in some "exceptional" cases, be greater than 5 nanometers when they are initially introduced into the reaction mixtures so long as they are ultimately reduced in the reaction mixture to particles having average diameters of less than 5 nanometers (and here again, preferably reduced to particles of less than 2 nanometers) by the time the reaction mixture undergoes spray drying. That is to say that reductions in the size of certain ingredient particles originally larger than 5 nanometers may be accomplished by physical and/or chemical action(s) ("physico/chemical action") of the other reaction mixture ingredients upon such particles (e.g., hydration by water in a water media) and/or by application of a vigorous mixing action to applicants' reaction mixture, especially just prior to spray drying.

In other words, applicants have determined that chemical and/or mixing actions can reduce the size of certain ingredient particles to the required 5 nanometer size. However, this is only true in certain select cases wherein the particles have crystalline structures which are characterized by their possession of unequal lattice spacings between those atoms which make up the select particle's crystalline structure. A more detailed description of these lattice spacing inequalities will be given in subsequent paragraphs of this patent disclosure. The existence of these exceptional cases should not, however, negate or even deemphasize the fact that applicants have discovered that if an original ingredient's particle size is reduced to less than about 5 nanometers before it is used in the herein disclosed processes, then there need be no further size limitations applied to such particles. Nonetheless, it should also be understood that applicants have found that their initial, 5 nanometer or less, starting material particles are themselves, usually, further reduced in size by subsequent chemical and/or mixing actions. Therefore, applicants have chosen to call the resulting "reduced size" of all reactive particles in a liquid media, the particle's ultimate crystallite size ("ultimate crystallite size"). In other words, applicants' research indicates that even if absolutely no reduction in particle size takes place in those particles originally meeting the 5 nanometer limitation placed upon them prior to their introduction into applicants' liquid medium and/or prior to application of shear forces to the liquid media, the herein disclosed process can be successfully carried out. Therefore, applicants originally "assumed" that their ultimate crystallite size also has a 5 nanometer (or less) particle size limitation. This original assumption was, however, subsequently verified by certain electrophoresis studies hereinafter more fully described.

For example, with respect to such "exceptions" to their "5 nanometer rule," applicants have found that some alumina-containing ores such as boehmite and psuedo-boehmite may be employed as original ingredients in applicants' process even though their ore particle sizes often range from about 20 up to about 60 nanometers. That is to say that even though these ore particles have up to about 60 nanometer sizes when they are introduced into applicants' reaction system, they are so susceptible to undergoing hydration and/or so susceptible to being broken down by a mixing action applied to the reaction system that the 60 nanometer ore particles are soon reduced to an "ultimate crystallite size" of 5 nanometers or less at the all-important moment in time when they undergo applicants' spray drying step. It also should be noted, however, that there appears to be an upper limit for the sizes of those particles which are susceptible to being broken down in this manner. For example, applicants have found that spinel ingredient particles larger than about 60 nanometers are not likely to readily undergo breakdown to applicants' desired ultimate crystallite size limitation of 5 nanometers or less. Applicants also have found that hydration action alone is often sufficient to produce applicants' desired ultimate crystallite sizes in many such ingredients, but that the time required to accomplish a hydration breakdown of the 60 nanometer particles can be greatly shortened by the conjunctive use of a vigorous mixing action. Conversely, particles having sizes greater than about 60 nanometers are not readily broken down by hydration alone; and as a general rule particles larger than about 60 nanometers cannot readily be broken down by hydration and/or vigorous mixing.

Verification that a given species of particle is less than 5 nanometers is of course easily obtained when a particle is in a "dry" state. Various methods including certain x-ray diffraction tests hereinafter more fully described can be used to make very accurate particle size determinations. As previously noted, this is why applicants have emphasized limitations based upon the size of the "dry" particles used to make up the initial ingredients. Unfortunately, such particle size measurements are not as easily made when the particles in question are dispersed in a liquid medium (as a colloidal sol, for example). Consequently, other kinds of measurements, more suitable to being made in the context of a liquid medium, can be employed to estimate the size of applicants' particles at the time they attain the ultimate crystallite size postulated for the moment at which the total reaction mixture undergoes spray drying. For example, various electrophoretic measurement methods, well known to the art, can be employed to make size measurements in the "wet" state in which applicants' particles exist at their ultimate crystallite sizes.

There are, however, nuances to such tests which must be appreciated for the successful practice of this invention. For example, it should be fully appreciated that migration of particles—such as applicants' ingredient particles—through a viscous medium by means of electromotive forces will yield data with respect to so-called "equivalent solid spherical particle sizes" according to observed variations in velocities through the viscous medium employed. These velocity variations are of course created in accordance with variations in the electromotive forces applied. However, with increasingly rapid motion, a particle's orientation will become such that the aspect of the particle will become more and more oriented to a path that presents the least "viscous drag" upon that particle. Moreover, such differences are particularly apt to occur when particles between about 2 nanometers and about 20 nanometers are subjected to higher and higher velocities in electrophoresis tests. Consequently, these concerns are of particular relevance with respect to the 5 nanometer limitation applied to applicants' ultimate crystallite size.

Consequently, applicants have found that in many, if not most, cases an eccentricity factor should be applied to the "idealized" spherical shape which is usually assumed in such electrophoretic tests. That is to say that applicants have found that many particles of the type contemplated for use in their processes do in fact have "nonspherical" shapes. They can vary from mildly ellipsoidal (e.g., football-like) to decided needle-like shapes. Therefore, applicants have found that an average "eccentricity factor" ($\epsilon$) should be inferred for ingredient particles measured by electrophoretic methods in order to account for their departure from the usual Stokes' Law assumption of a "perfectly spherical body". Moreover, applicants' work in this area has led them to be of the opinion that many discrepancies in reported sizes for "the same" species and source of given particles can be explained by failures to evaluate, through repeated observations, an accurate eccentricity factor ($\epsilon$) for particles being measured by such electrophoretic methods.

Applicants also have concluded that in all cases where their ingredient particles are not perfect spherical bodies, their 5 nanometer average diameter size limitation should be applied to the longest linear dimension of that particle, whatever its shape. This limitation should be applied to both dry crystals and wet ultimate crystallites. Thus, for example, if a given crystal happened to have a hotdog-like shape, the 5 nanometer limitation would be applied to its long axis rather than its cross sectional diameter. It should also be noted in passing that many ultimate crystallites tend to take on amorphous shapes as they evolve from crystalline forms under the physico/chemical actions previously discussed.

Ideally of course there should be nearly exact correlations between size measurements made by the various applicable measuring methods. However, since x-ray diffraction techniques are not well suited to being carried out in the "wet" environment in which electrophoretic techniques are normally conducted, and since many crystalline particles are in fact converted to more amorphous shapes in the process of attaining their "ultimate crystallite sizes", the results of these two methods sometimes may need to be correlated.

Such correlations can usually be accomplished by regression analysis of the results of a series of electrophoresis tests carried out at various particle velocities through the same viscous medium. The results can then be correlated to measurements made by x-ray diffraction methods. Such a regression analysis is of course subject to certain sources of error. Consequently, applicants prefer x-ray diffraction methods to make particle size measurements wherever this method is readily applicable. Nonetheless, information obtained from electrophoretic methods can aid in determining the size of a given species of particle in a reaction mixture (dispersion) at the moment it is spray dried. Hence electrophoretic methods are very valuable in determining whether or not particles of a given species, which were originally larger than 5 nanometers, have in fact been reduced in size to the degree necessary to meet applicants' 5 nanometer size limitation when they attain their ultimate crystallite size. That is to say that electrophoretic techniques represent a very convenient way of determining whether or not a species of particle which is larger than 5 nanometers as a "dry" crystal is in fact reduced by any chemical and/or mixing action supplied by, or mechanically imparted to, the reaction mixture in order to reduce larger particles (e.g., up to 60 nanometers in diameter) to particles of 5 nanometers or less size. Thus bodies of data with respect to the size of various ingredients can be acquired by both test methods, and if need be, the results of the electrophoretic methods can be correlated to known values produced by x-ray diffraction methods when the proper eccentricity factors for particular particles are taken into account.

For example, it was through use of such correlation methods that applicants confirmed that their 5 nanometer "ultimate crystallite size" limitation—which was originally inferred from the successful results obtained from the use of original ingredient particles having average particle diameters of 5 nanometers or less—is a "valid" limitation for any particle, wet or dry. Again, applicants confirmed that alumina particles of up to about 60 nanometers in diameter—such as those obtained from the ores boehmite and psuedoboehmite—can, in fact, be reduced to ultimate crystallite sizes of less than 5 nanometers in a suitable media (a water media which may include mineral or organic acids) and especially under conditions of vigorous mixing.

It should also be noted that, after observing that their 5 nanometer specification for ingredient particle sizes can be relaxed for certain ingredient species, but not for others, applicants conducted an experimental program to find the reasons why some ingredient particles which are originally (e.g., in a dry state) larger than 5 nanometers (e.g., boehmite and psuedoboehmite) can be broken down by a reaction medium (e.g., water) while other crystalline materials having particle sizes larger than 5 nanometers could not be broken down to sizes suitable for successful practice of this invention. Briefly, applicants found that those ingredient particles which can be broken down by a liquid medium (and/or by mixing) to the extent that they met applicants' 5 nanometer or less ultimate crystallite size criterion, are also characterized by low eccentricity factors ($\epsilon$) when they were subjected to electrophoretic testing.

Applicants then found that these low eccentricity factors, in turn, are associated with those particles having lattice structures wherein the spacings between atoms (e.g., between the magnesium, the aluminum and the oxygen atoms) at the nodal points (the locations of the various atoms) of the lattice structure, when "viewed" by x-ray techniques, from a first viewing plane of said crystalline lattice structure are not equal to the spacing between atoms at nodal points of the lattice structure when viewed from a second viewing plane (and/or from a "third" viewing plane). It is also useful to keep in mind the fact that such viewing planes need not be orthogonal in such crystalline lattice structures.

That is to say that applicants have found that if an original particle is larger than 5 nanometers, then it can only be broken down to applicants' 5 nanometer ultimate crystallite size—under the conditions which otherwise exist in applicants' processes—if the particle's crystalline structure has lattice spacings which are unequal along at least two of the crystalline axes. Even more susceptibility to such breakdown has been observed in those crystalline lattice structures wherein all three planes (again, such planes need not be in an orthogonal X, Y, Z axis system) are characterized by their possession of lattice spacings along one or more axes which are each different from lattice spacings along another axis, as attested by definitive testing of rotations observed in so-called XRD (i.e., x-ray) determinations along more than one crystal plane. More information about the XRD determinations used to establish the scope of this invention will be given in later portions of this patent disclosure. Before going on to such matters, however, it will be useful to put applicants' particle size limitations into the context of their overall process.

Typically, applicants' spinel production process starts with a mixing of the $R^{2+}[A]$ and $R^{3+}[B]$ ingredients (and optional ingredients $.R^{2+}[C]$, $.R^{3+}[D]$ and/or viscosity agents, if any); however, it should also be noted that some of the "mixing" can take the form of purchasing pre-mixed ingredients as well as by preparing and mixing such ingredients just prior to their use in applicants' process. In either case, however, the maximum permissible distribution of such ingredients would be a colloidal gel dispersion (as a solute phase) whose units are no more than about 5 nanometers, and preferably less than 2 nanometers, in a liquid medium/colloidal suspension of any and all of the ingredient compounds in a liquid medium (solvent phase). Again, the size of the particles, just at the moment of spray drying is the most critical point for application of applicants' 5 nanometer size limitation, but for the sake of consistency with our most general case (i.e., 5 nanometer "dry" particles)—as opposed to our special case (i.e., breakdown of certain particles, larger than 5 nanometers) applicants will now revert back to discussions based upon the assumption of using ingredients having particles having average diameters of 5 nanometers or less when measured at their longest linear dimension.

In any case, the resulting composition might be characterized as the "total mixture" or the "total reaction mixture" or the "total dispersion." Applicants also have found that particularly good results are obtained from the herein disclosed processes when the liquid medium constitutes from about 50 to about 90 weight percent of the total mixture. It also should be noted in passing that such a medium may be a solution of all remaining ingredient compounds. Moreover, as a part of the overall approach of the herein disclosed processes, it will usually be highly advantageous to maintain the original $R^{2+}[A]/R^{3+}[B]$/liquid medium dispersion in a homogeneous state by continuous, vigorous agitation of the $R^{2+}[A]/R^{3+}[B]$/liquid medium reaction mixture (again, this mixture could also be called a "dispersion" or a "micro-colloidal dispersion"), up to the moment of applicants' volatilization or spray drying step.

Applicants have also established that, once having met the 5 nanometer particle size limitation criterion as an overriding requirement, other process parameters, which are so very important to the prior art methods of producing synthetic spinels, are relegated to a level of secondary importance—or, in many cases, relegated even to a level of virtual irrelevance or obviation. Not the least of these now secondary" conditions for success in applicants' processes is the pH of the starting compositions and the pH of the resulting total mixture of $R^{2+}[A]$, $R^{3+}[B]$ and liquid medium. Again, the previously noted acidic nature of applicants' starting materials and overall reaction systems stand in sharp contrast to the very strong prior art concerns (e.g., the previously noted teachings of the 070 and 635 patents) for employing basic, alkaline earth metal-containing compositions and for using resulting reaction mixtures having pH values which generally lie in the alkaline pH range of 7 to 10.5 and, better yet, in a range of about 8.5 to about 9.5. In other words, applicants have found that by employing their strict, 5 nanometer, size constraint limitations, the pH of applicants' initial ingredients and their resulting final liquid medium/colloidal suspensions become largely unimportant over the extremely wide range of pH values from about 3.0 to about 6.5. That is to say that the reaction step of applicants' process can, in fact, be carried out over an extremely broad range of the acid region of the pH scale. However, applicants' preferred pH range for the $R^{2+}[A]/R^{3+}[B]$/liquid medium (which medium can itself be a mixture of ingredients such as a water/mineral acid mixture) will often be between about 3.5 and about 4.0. Again, this is significant in that it shows that applicants' process operates (and in fact most preferably operates) in the acidic range of from about 3.0 to about 6.5 while the processes of the prior art, such as those of the 070 patent and the 635 patent, operate in the basic region of the pH scale. This ability to operate in an acidic reaction mixture also serves to show that applicants' processes are qualitatively different from those of the prior art even though the chemical identities of the reactive ingredients may be the same.

By way of further contrast with most prior art processes for producing such synthetic spinels (and especially by way of contrast with the process of the 070 patent), it also should be noted that applicants' starting materials need not be only the hydroxides of $R^{2+}$ and $R^{3+}$, but rather may vary to such other species as their nitrates, oxides, alkoxides, acetates, hydroxynitrates and hydroxyacetates, as well as salts of many other organic and inorganic salts and compounds of the basic $R^{2+}$, $R^{3+}$ ingredients. Thus, applicants' new found latitude in ingredient selection permits use of the more liberal criteria of availability of the ingredients, their costs and their ease of formulation. Again, this newfound latitude with respect to pH, as well as with respect to ingredient selection, stands in sharp contrast to the very narrow pH and/or ingredient constraints imposed in most prior art processes for the production of spinels. Again, not the least of the advantages which follow from this new latitude is the fact that the economics of producing applicants' spinels are much better than those associated with prior art production methods.

As further evidence of the scope of this invention, applicants have established that the particle "size" considerations emphasized in this patent disclosure, to some degree, also entered into the previously discussed failures co-mulling procedures and dispersion procedures to produce high quality spinels. That is to say that in both of these procedures, the MgO and $Al_2O_3$ ingredients were present as relatively "large" particles (i.e., they were, at the very least, greater than 10 nanometers in all known cases). For example, applicant estimates that the prior art co-mulling procedures produced particles having average diameters of about 100 microns (i.e., 100,000 nanometers). Similarly, applicants have estimated that the spray drying procedures employed in the process of the 635 patent were generally employed on dispersions having active ingredient particles of no less than about 200 nanometers. Applicants have theorized that such relatively large particle sizes preclude mixing on the atomic level (e.g., at ingredient interatomic distances of less than 50 angstroms, and preferably less than 20 angstroms) which applicants have found to be necessary to obtain the degree of intimacy necessary to forestall, arrest and/or preclude (as much as possible), any undesired, but thermodynamically favored, chemical reactions before formation of a solid matrix can effectively "freeze" such ingredients in a homogeneous solid solution.

Again, applicants' rapid volatilization is a most important step in "arresting" or "freezing" the ingredient compounds $R^{2+}[A]$, $R^{3+}[B]$, $.R^{2+}[C]$, $.R^{3+}[D]$, etc., into a "static" chemical composition. In effect such volatilization dissipates the liquid media in such a rapid manner as to "fix" the various ingredients in a solid matrix. In other words, applicants' process is intended to fix the spinel's $R^{2+}$, $R^{3+}$, $.R^{2+}$, $.R^{3+}$, etc. compounds before their thermodynamically favored chemical interreactions can take place. Other auxiliary steps hereinafter more fully described may also be taken to aid in "freezing" the ingredients in the desired homogeneous distribution. It might even be said that, in effect, applicants' process seeks to emulate the crystallization of molten spinels which was originally achieved in nature under conditions of great pressure and temperature by freezing or arresting, in whatever proportions, the relative amounts of molecular ingredients in a solid matrix. Again, such "fixing" or "freezing" can be readily accomplished by rapid dissipation of the liquid medium under the conditions of spray drying, i.e., under conditions wherein the total mixture is atomized to small liquid spherical droplets in an atmosphere of sweeping heated gases (which may be air) with concomitant rapid evaporation of the liquid medium at the boiling point of whatever liquid phase is present at nominally atmospheric pressure. Again, such spray drying operations can be carried out by techniques well known to this art (e.g., such as those disclosed in the 635 patent which is, in its entirety, incorporated by reference into this patent disclosure) in order to produce MS (microspheroidal) particles in a range of sizes such that, most preferably, essentially all particulate materials resulting from said spray drying (and from subsequent calcining) will be retained by a Standard U.S. 200 mesh screen and essentially all will be passed by a Standard U.S. 60 mesh screen.

By way of further clarification, the spray drying equipment which can be used in applicants' process may employ at least one restriction or high pressure nozzle having a diameter in the range from about 0.01 in. to about 0.2 in. and preferably from about 0.013 in. to about 0.15 in. The pressure upstream of such a high pressure nozzle may range from about 400 psig. to about 10,000 psig. and preferably be maintained between about 400 psig. and about 7,000 psig. The material to be spray dried is sent through the nozzle system into a space or chamber. The pressure in the space or chamber downstream from the nozzle system is lower than that immediately up-stream of the nozzle and is typically in the range from about 0 psig. to about 100 psig., and preferably be from about 0 psig. to about 20 psig. Once through the nozzle, the material may be contacted for a relatively short time, e.g., from about 0.1 seconds to about 20 seconds with a gas stream which is at a temperature of from about 200° F. to about 1500° F. and preferably from about 200° F. to about 750° F. in order to complete the spray drying step. The gas stream which may be, for example, air or the flue gases from an inline burner (used to provide a gas stream having the proper temperature) or a substantially oxygen-free gas, may flow co-current, counter-current or a combination of the two relative to the direction of flow of the material to be dried. The spray drying conditions, such as temperatures, pressures and the like, may be adjusted because of, for example, variations in the composition of the material to be dried in order to obtain optimum results which are achievable through routine experimentation.

An alternative to the high pressure nozzle described above is a so-called "two-fluid" nozzle in which the material to be dried is dispersed by a stream of gas, typically air. Such a two fluid nozzle has the advantage of being able to employ a low operating pressure, e.g., from about 0 psig. to about 60 psig. for the material to be dried and from about 10 psig. to about 100 psig. for the dispersing gas. The dispersing gas may also function as at least a portion of the drying gas stream. The various operating parameters noted above may be systematically varied in order to achieve the desired particle size. For example, in order to minimize contact between the chamber walls and wet material, the chamber downstream from the nozzle system can be made large in size, e.g., from about 4 to about 30 feet in diameter and from about 7 to about 30 feet long, often with an additional conical shaped portion for convenient withdrawal of the spray dried material. The spray drying apparatus may also include separation means, e.g., cyclone separators in the outlet gas line to recover at least a portion of the material entrained in this stream.

It should also be noted, however, that in addition to such a spray drying step, applicants' overall process can be enhanced by use of a separate and distinct drying step which is carried out after the drying which naturally results from the spray drying step. Such additional drying may in many cases serve to better "freeze" the ingredients in the homogeneous state in which they originally existed in the reaction mixture. That is to say that the "solid" particle product of applicants' spray drying step, flashing, etc., may then be, as an optional process step, desiccated or dried in a manner other than the drying accomplished by the spray drying or flashing, in order to remove any remaining traces of the liquid medium which may be still present in the interstices of the particles and/or associated with the particulate product of the spray drying step as water of hydration. Drying times for this distinct drying step will normally take from about 0.2 hours to about 24 hours at temperatures preferably ranging from about 200° F. to about 500° F. (at atmospheric pressure), but in all cases, at temperatures greater than the boiling point of the liquid medium employed (e.g., greater than 212° F. in the case of water). In any case, such drying will usually suffice to produce a powder-like, completely anhydrous, product. That is to say any remaining liquid medium which may have been physically associated with and/or loosely chemically bonded with (e.g., as water of hydration) the solid phase product of the volatilization step, whether it be, at this point in the overall process, in a crystalline lattice form, or in an amorphous solid form, or in a gel form, can be driven off by a separate and distinct desiccation, drying, etc. step. In any event, the result of applicants' use of such additional drying or desiccation step will be an aggregate of particles of fine, anhydrous, powder whose ingredients are not able to depart from their original physical identity as a homogeneous distribution of $R^{2+}[A]$, $R^{3+}[B]$, $.R^{2+}[C]$, $.R^{3+}[D]$, etc. ingredients in the original reaction mixture.

After such drying or desiccation—if desiccation is employed—it remains only to take the solid matrix of the anhydrous particles and convert (in a solid state, i.e., without melting said particles) the $R^{2+}[A]$, $R^{3+}[B]$, etc. ingredients to their oxides, $R^{2+}O$, $R_2^{3+}O_3$, etc. by a calcination step which—aside from the creation of the $R^{2+}O$ and $R_2^{3+}O_3$ oxides in a spinel matrix $R^{2+}O.R_2^{3+}O_3$—also serves to drive off, as gaseous oxides, all but the "desirable" components "designed" into the synthetic spinel's lattice and thereby leaving only oxides of those desirable $R^{2+}$ and $R^{3+}$ elements (and optionally, oxides of only those other divalent metal ions designated as $.R^{2+}$ in place of a portion of the $R^{2+}$ ions, and/or other trivalent metal ions which are designated as $.R^{3+}$ ions in place of a portion of the $R^{3+}$, etc.) which are fixed in a homogeneous, solid solution. Such calcination is readily accomplished by calcining the particle products of the spray drying step—or of the optional desiccation step—at temperatures ranging from about 1,000° F. to about 2,000° F. (at atmospheric pressure) for from about 60 minutes to about 240 minutes, and most preferably at about 1,350° F. for about 180 minutes.

The above noted process guidelines can be restated in more specific terms as a process for making synthetic spinels having the general formula $R^{2+}O.R_2^{3+}O_3$ wherein $R^{2+}$ is a first metallic element having a divalent oxidation state and $R^{3+}$ is a second metallic element having a trivalent oxidation state (and which, together, can be synthesized into a solid solution of the octahedral habit of spinels of metallic oxides of $R^{2+}$ and $R^{3+}$), said process comprising: (1) mixing, to a homogeneous consistency, (i) a composition (normally one having a liquid phase) having a $R^{2+}[A]$ compound and having a pH from about 3.5 to about 6.5 ("the $R^{2+}[A]$ composition") and whose $R^{2+}[A]$ chemical units or particles are in a size range from molecular size to particles having average diameters not greater than about 5 nanometers, (ii) a composition (again, normally one having a liquid phase) having a $R^{3+}[B]$ compound ("the $R^{3+}[B]$ composition") whose chemical units or particles are also in a size range from molecular size to particles having average diameters not greater than about 5 nanometers, and mixed such that the starting ratio of $R^{2+}$ atoms to $R^{3+}$ atoms is from about 0.5 to about 1.25 and (iii) such amounts of a liquid medium necessary to produce a total mixture (reaction mixture) having a pH between about 3.5 and about 6.5 and wherein the liquid medium constitutes from about 50 to about 90 weight percent of said total mixture and wherein: (i) $R^{2+}$ is a first metallic atom having a first, positive, oxidation state, (ii) $R^{3+}$ is a second metallic atom having a second, positive, oxidation state higher than the first positive oxidation state of the first metallic atom, and (iii) [A] and [B] are each comprised of nonmetallic (anionic) elements (including anionic radical groupings) which bear a net negative charge when they are, respectively, chemically bonded to the $R^{2+}$ and $R^{3+}$ metallic atoms and which, when subjected to prolonged heating in the presence of oxygen at elevated temperatures of calcination, will form gaseous oxides of the nonmetallic elements of [A] and [B]—other than oxygen itself; (2) spray drying the total mixture under conditions such that: (i) the liquid is evaporated to a gaseous state at such a rate as to arrest or preclude migration of the $R^{2+}$[A] compound and the $R^{3+}$[B] compound (and any other optional compounds, $.R^{2+}$[C]; $.R^{3+}$[D], etc. wherein the "." before the $R^{2+}$, $R^{3+}$, etc. designates the fact that the ingredient is an optional ingredient) through the liquid medium, (ii) segregation of the $R^{2+}$[A] compound and the $R^{3+}$[B] compound into discrete enclaves within a resulting solid solution is arrested or precluded, (iii) finely divided, solid, particles are obtained wherein the starting ratio of $R^{2+}$ atoms to $R^{3+}$ atoms is substantially maintained (given applicants' tolerance for up to 5% by weight of complex compounds in the spinel) and (iv) only residual amounts of the liquid medium remain associated with the particles; (3) as an optional, but preferred, process step, desiccating the particles at temperatures higher than the boiling point of the liquid medium in order to remove any residual amounts of the liquid medium or loosely bonded water of hydration and thereby obtaining, in the form of a powder, anhydrous particles which still substantially maintain the ratio of $R^{2+}$ atoms to $R^{3+}$ atoms in the original mixture and which are substantially free of discernable complex compounds of $R^{2+}$ and $R^{3+}$; and (4) calcining the anhydrous particles under conditions which produce crystals of a solid solution of $R^{2+}$ oxide ($R^{2+}O$) and $R^{3+}$ oxide having a range of molecular ratios of $R^{2+}O$ to $R_2^{3+}O_3$ from about 1.0 to about 2.5 and drive off, as gases, substantially all other elements present in the crystal (i.e., other than those elements contained in the $R^{2+}O$ and in the ($R_2^{3+}O_3$) and thereby producing a spinel crystalline lattice $R^{2+}O.R_2^{3+}O_3$ which is substantially free of complex compounds of $R^{2+}$ and $R^{3+}$ atoms and/or "free" surplus metal oxide compounds.

As previously noted, this process can employ a wide variety of starting materials. A list of such materials would include, but by no means be limited to, materials wherein: (i) $R^{2+}$ (and/or $.R^{2+}$) can be selected from the group consisting of magnesium, zinc, calcium, iron and manganese, (ii) $R^{3+}$ (and/or $.R^{3+}$) can be selected from the group consisting of aluminum, cerium, iron, boron, manganese, lanthanum, chromium and the like (i.e., metals having like valences), [A] (or [C]) is an anionic species which serves to produce an acidic, alkaline earth metal-containing composition for use in preparing applicants' reaction mixture and (iii) the liquid medium is selected from the group consisting of water, alcohols having carbon chains containing up to 20 carbon atoms, ether, acetone and the like. Some preferred anionic species of [A] anions can be selected from the group consisting of acetate (which is a particularly effective anion species for the practice of this invention), nitrate, ethylate, ethoxide and mixtures thereof, while the anionic [B] (or [D]) species can be selected from the group consisting of nitrate, oxide, hydroxide, hydroxynitrate, acetate, hydroxyacetate, and mixtures thereof. Thus some particularly preferred starting materials might include combinations wherein the $R^{2+}$[A] compound is selected from the group consisting of $R^{2+}$ nitrate, $R^{2+}$ oxide, $R^{2+}$ hydroxynitrate, $R^{2+}$ hydroxyacetate, $R^{2+}$ acetate, $R^{2+}$ ethylate and the $R^{3+}$[B] compound is selected from the group consisting of $R^{3+}$ nitrate, $R^{3+}$ hydroxynitrate, $R^{3+}$ acetate, $R^{3+}$ hydroxyacetate, $R^{3+}$ hydroxide, $R^{3+}$ oxide and the like. It should also be noted that, in the case of a sol, [B] or [D] would normally be an oxide and that an acid usually would be used to disperse the $R_2^{3+}O_3$ compound. Such an acid could be selected from the group consisting of those mono-basic organic acids and/or mono-basic mineral acids which would not leave residues upon decomposing (e.g., under calcining conditions). For example, a highly preferred mono-basic organic acid would be acetic acid and a highly preferred mono-basic mineral acid, for example, would be nitric acid.

Applicants' experimental work with respect to defining the $R^{2+}$[A] ingredients also generally established a certain preference for using magnesium acetate solutions in many of the reaction systems which were investigated. Their use produced magnesia-rich spinels with as much as 53.2% excess magnesia and this proved to be about the maximum percentage possible when applicants started with an Al/Mg atomic ratio of 1.0 to 1.9. It should also be noted in passing that one of applicants' other more preferred variations was to use a soluble magnesium salt that contains an especially decomposable acetate such as magnesium hydroxyacetate, e.g., such as one prepared by digesting magnesia in magnesium acetate at a temperature of 90° C., as the source of magnesium. Magnesium hydroxynitrates can be used in a similar manner.

Some other particularly preferred variations of applicants' fundamental process involve the use of various auxiliary techniques to aid in the "freezing" of the ingredients otherwise accomplished by applicants' spray drying step. Such auxiliary techniques for aiding this freezing might include: (1) use of organic thickening agents, (2) use of nonorganic thickening agents such as alumina (i.e., alumina in addition to that employed in say a magnesia, alumina reaction mixture), (3) adjustment of pH levels in the reaction mixture, (4) adjustment of the solids content of the reaction mixture fed to the spray dryer and/or (5) aging of sol reaction mixtures before carrying out the spray drying step. For example, one particular variation on the idea of adjustment of the solids content of the reaction mixture fed to the spray dryer might include the use of additional amounts of a liquid medium (or media), added to the liquid medium (or media) originally present in the $R^{2+}$[A] compound and $R^{3+}$[B] compound, in order to bring the liquid medium (or media) to 50 to 90 weight percent of the total or overall mixture of reactive ingredients and liquid medium (or media)—not counting any additional ingredients such as thickening agents, if such agents are in fact present in the total reaction mixture. That is to say that, in the absence of any other "solid" ingredients such as viscosity agents, the reactive ingredients $R^{2+}$[A] and $R^{3+}$[B] can constitute from about 10 to about 50 weight percent of the total mixture while the liquid media constitutes from about 90 to about 50 weight percent of said total mixture. Thus, for example, a reaction mixture containing 10% by weight of reactive ingredients $R^{2+}[A]$ and $R^{3+}[B]$ and 20% by weight of additional ingredients (such as viscosity agents) would ultimately, according to applicants' preferred proportions, contain 70% by weight liquid medium (or media). Similarly, given the lower limitation on the liquid media of 50% and given use of say 40% of the $R^{2+}[A]$ and $R^{3+}[B]$ ingredients in total reaction mixture, then the additional ingredient(s), e.g., a viscosity agent, would not be more than 10% by weight of the total reaction mixture. As a final note regarding the presence and proportions of such preferred, but non-essential, ingredients, applicants have found that such ingredients, e.g., gas evolution promoters and/or viscosity agents such as starch, STEREOTEX ®, gum arabic, etc. if used can constitute from about 5% to no more than about 35% by weight of the total reaction mixture. Most preferably such preferred, but optional, agents will constitute from about 20% to 25% weight percent of the total reaction mixture.

Thus, for example, starch or gum arabic can be introduced in a concentration of say 20% by weight into a total reaction mixture otherwise comprised of say 10% by weight magnesium acetate, 10% by weight aluminum oxide (including a minor amount, e.g., about 2% of acetic acid) and about 58% water in order to increase the viscosity of the resulting total reaction mixture and thereby serve to inhibit migration of molecules or colloidal particles of the $R^{2+}[A]$ and $R^{3+}[B]$ ingredients through the liquid phase during and/or after the volatilization step. That is to say that by adding such viscosity agents, applicants seek to inhibit reaction kinetics (speed of reaction), thermodynamic favoring notwithstanding, by including such optional ingredients in the original, intimate, reaction mixture, in order to raise its viscosity and thereby decrease the mobility of the reactive ingredient particles while they are dissolved in the liquid phase. In other words, such materials can provide the mixture undergoing volatilization with a better opportunity to form a solid matrix before a chemical reaction, (e.g., formation of stoichiometric spinel) can take place. It should also be noted that in later portions of the overall production process—largely because of the manner in which such viscosity agents break down and are replaced in a calcining environment—these optional agents also may well serve to promote the desired evolution of gases during calcination. Again, applicants have found that total mixtures comprised of from about 5 to about 35 weight percent, and preferably from about 20 to about 25 weight percent, of one or more viscosity agents such as gum arabic and starch, are particularly effective in aiding the desired "freezing" of the reactive ingredients during the volatilization step and/or during calcination.

Similarly, relatively small amounts (e.g., 5 to 30 weight percent) of certain other optional or "adjunct" materials may be employed as "weighing agents" in the practice of this invention in order to impart certain density characteristics to such spinels, especially those used in FCC units where particle density is an important consideration. That is to say that such materials may be employed more for their effect on the density of the resulting spinel than for their effect on the spinels' $SO_x$ catalytic activity. Applicants have, for example, found that the lanthanum/cerium mineral bastnasite is particularly useful in that it can be used both as a source of cerium and as a means of adjusting the density of such spinels.

Applying some of these preferred features to applicants' overall process in order to make $MgO.Al_2O_3$, a synthetic spinel especially valued for its $SO_x$ catalytic activity, might involve starting with an original mixture wherein the ratio of magnesium atoms to aluminum atoms will lie in the range of 0.5 to 1.25, i.e., in the range which produces a range of 1.0 to 2.5 molecules of a resulting magnesium oxide (MgO), aluminum trioxide ($Al_2O_3$) spinel. Most preferably this atomic ratio range will be from 0.66 to 1.0. Expressed in molecular ratios, the broad range is 1.0 to 2.5 and a more preferred range is 1.33 to 2.0. Applied to the production of $MgO.Al_2O_3$, applicants' process might comprise: (1) mixing, to a homogeneous consistency, (i) a liquid magnesium composition Mg[A] having a pH from about 3.5 to about 6.5 ("the magnesia") and having a Mg[A] compound whose chemical units or particles are in a size range from molecular sizes to particles having average diameters up to about 2 nanometers, (ii) a liquid aluminum composition Al[B] having an acidic pH between about 3.5 and 6.5 ("the alumina") and having a Al[B] compound whose chemical units or particles are also in a size range from molecular to particles having average diameters up to about 2 nanometers, and combined such that the starting ratio of magnesium atoms to aluminum atoms is in the range of 0.5 to 1.25 and preferably collectively constituting from about 10-30 weight percent of a resulting total mixture, (iii) a viscosity agent such as gum arabic which preferably comprises about 20-25 weight percent of said resulting total mixture and (iv) such amounts of a liquid medium such as water (an acid also will be present) necessary to produce a total mixture wherein the liquid medium preferably constitutes from about 50 to about 65 weight percent of said total mixture and has a pH from about 3.0 to about 6.5, and more preferably a pH from about 3.5 to about 4.5 and which is at least partially achieved through the use of an organic acid such as acetic acid (that is to say using the organic acid in order to aid in producing an acidic total mixture); (2) spray drying the total mixture under volatilizing conditions such that: (i) the liquid medium is flashed to a gaseous state at such a rate as to arrest migration of the magnesia and the alumina through the liquid medium, (ii) segregation of the magnesia and the alumina into discrete enclaves within a resulting solid solution is precluded, (iii) finely divided, solid, particles are obtained wherein the starting ratio of magnesium atoms to aluminum atoms is substantially maintained in each particle however small it may be and (iv) only residual amounts, if any, of the liquid medium remain associated with said particles, (3) optionally, but preferably, desiccating the particles at temperatures higher than the boiling point of the liquid medium for from about 0.2 of an hour to about 24.0 hours in order to remove any residual amounts of the liquid medium and thereby obtaining, in the form of a powder, anhydrous particles which still substantially maintain the starting ratio of magnesium atoms to aluminum atoms in the originally selected ratio within the range of 0.5 to 1.25; and (4) calcining the anhydrous particles resulting from the drying under conditions which produce crystals of a solid solution of magnesium oxide (MgO) and aluminum oxide ($Al_2O_3$) having a range of molecular ratios of MgO to $Al_2O_3$ from substantially 1 to substantially 2.5 and driving off, as gases, substantially all other elements present in the crystal (i.e., other than those elements contained in the MgO and in the $Al_2O_3$ components of the spinel's crystalline structure) and thereby producing a spinel crystalline lattice which is substantially free of complex compounds of aluminum and of "free" magnesium oxide, but in no case having more than about 5% by weight of such complex compounds of magnesium and aluminum.

Again, the magnesia, Mg[A] used in the preferred process just described could be, but by no means need be, selected from the group consisting of magnesium acetate (here again, an especially preferred form of magnesium compound Mg[A] for the practice of this invention is magnesium hydroxyacetate), magnesium nitrate, magnesium ethylate, magnesium hydroxynitrate, magnesium oxide, and mixtures thereof; (ii) the alumina, Al[B], could be, but need not be, selected from the group consisting of aluminum oxide, aluminum hydroxide, aluminum nitrate, aluminum acetate, aluminum hydroxynitrate, aluminum hydroxyacetate, aluminum ethoxide and mixtures thereof; and (iii) the liquid medium could be, but need not be, selected from the group consisting of water, alcohols, acetone, ether and the like along with minor amounts (e.g., from 0.5 to 3.0% by weight) of suitable dispersants, if any, (such as organic acids or mineral acids) and mixtures thereof. For purposes of this patent disclosure, the Mg[A] compound, whatever the composition of the anionic fragment [A], can be termed "the magnesia." Similarly, $Al_x[B]_3$, whatever the composition of the anionic fragment [B], noting that the reduction level of [B] is the value x, can be termed "the alumina."

The above-described process needs only slightly modified changes and/or limitations or in order to be applicable to those previously described ingredient materials (e.g., boehmite and pseudo-boehmite) which have "dry" crystalline sizes greater than applicants' 5 nanometer or less size limitation, but which can be reduced in a reaction system to "ultimate crystallite sizes" of less than 5 nanometers. Applied to the production of a $MgO.Al_2O_3$ spinel such a modified process will generally comprise: (1) mixing, to a homogeneous consistency: (i) a liquid composition of magnesium (Mg[A], "the magnesia") having a pH from about 3.5 to about 6.5 and a Mg[A] compound whose chemical particles are in a size greater than 5 nanometers, but less than about 60 nanometers, and which have a three dimensional crystalline lattice structure having three axes wherein the crystalline lattice structure having three axes has lattice spacings which are unequal along at least two of the three axes, and which can be broken down into particles having ultimate crystallite sizes of less than about 5 nanometers by physico/chemical forces applied during the process, (ii) a liquid composition of aluminum (Al[B], "the alumina") having an Al[B] compound whose chemical particles are also in a size greater than 5 nanometers, but less than about 60 nanometers, and which have a three dimensional crystalline lattice structure having three axes and lattice spacings which are unequal along at least two of the three axes, and which can be broken down into particles having ultimate crystallite sizes of less than about 5 nanometers by physico/chemical forces applied during the process, and mixed such that the starting ratio of magnesium atoms to aluminum atoms is substantially from 0.5 to 1.25 and (iii) such amounts of a liquid medium necessary to produce a total mixture having a pH between about 3.5 and about 6.5 and wherein the liquid medium is capable of breaking down the particles of the $R^{2+}[A]$ compound and the $R^{3+}[B]$ compound to their respective ultimate crystallite sizes and which constitutes from about 50 to about 90 weight percent of said total mixture and wherein the Mg[A] compound is introduced in the form of a composition having a pH from about 3.5 to 6.5 and [A] and [B] are comprised of non-metallic atoms which carry a net negative charge when, respectively, chemically bonded to the magnesia and alumina atoms and which, when subjected to prolonged heating in the presence of oxygen at elevated temperatures of calcination, will form gaseous oxides of the nonmetallic atoms of [A] and [B]; (2) spray drying the total mixture under such conditions that (i) the liquid medium is flashed to a gaseous state at such a rate as to arrest migration of the magnesia and the alumina through the liquid medium, (ii) segregation of the magnesia and the alumina into discrete enclaves within a resulting synthetic spinel is precluded and (iii) finely divided, solid, particles are obtained wherein the starting ratio of magnesium atoms to aluminum atoms of the total mixture is substantially maintained in said particles; and (3) calcining the finely divided, solid, particles under conditions which produce crystals of a solid solution of magnesium oxide (MgO) and aluminum oxide ($Al_2O_3$) having a range of molecular ratios of MgO to $Al_2O_3$ from substantially 1 to substantially 2.5 and drive off, as gases, substantially all other elements present in the crystal (i.e., other than those elements contained in the MgO and in the $Al_2O_3$) and thereby producing a synthetic spinel which contains no more than about 5% by weight complex compounds of magnesium and aluminum.

The remaining process steps concerning drying, calcination, etc. are for all intents and purposes the same as those employed when 5 nanometer, "dry" particles are used. It should be noted in passing that in those cases where, say, $R^{3+}$ ingredient particles, such as those of boehmite, are larger than 5 nanometers, this does not mean that the other spinel ingredient particles ($R^{2+}$ and/or $.R^{2+}$) must also have sizes larger than 5 nanometers. On the contrary, one ingredient (e.g., boehmite) can have large (e.g., 60 nanometers) particles while another reactive ingredient has particles less than 5 nanometers, or, in fact, be a "true solution" (e.g., magnesium acetate).

Another highly preferred variation of the basic concepts of this patent disclosure regarding particle size limitations will include associating applicants' synthetic spinels with various other materials known to promote $SO_x$ activity in synthetic spinels. Thus, as previously noted, the original mixture might be comprised of $R^{2+}[A]$, $R^{3+}[B]$, $.R^{2+}[C]$, $.R^{3+}[D]$ and so forth in a suitable liquid medium. For example, a cerium compound Ce[E] could be added to the original reaction mixture as, say, a soluble nitrate, e.g., $Ce(NO_3)_3$. In any event applicants' particle size and ingredient proportion (e.g., 10% to 50% by weight $R^{2+}[A]$, $.R^{2+}[C]$, $R_2^{3+}[B]$, $.R_2^{3+}[D]$ etc.) limitations should be applied to any resulting total reaction mixture containing such $.R^{2+}[C]$, $.R^{3+}[D]$ optional compounds. Quantities of any such third, fourth, etc. metal atoms $.R^{2+}$, $.R^{3+}$, etc. of up to about 20 weight percent of the final synthetic spinel can be added to the original $R^{2+}[A]$, $R^{3+}[B]$ reaction mixture to promote $SO_x$ activity. However, for largely economic reasons, final spinels having about 10 weight percent of certain metal atoms such as cerium are highly preferred. Again, in effect, such third, fourth, etc., metal atoms such as cerium will occupy those nodal positions in the spinel lattice which would otherwise be occupied by $R^{2+}$ and/or $R^{3+}$ atoms.

In another preferred variation of using "third" metals in applicants' $MgO.Al_2O_3$ crystalline structures, vanadia (and especially vanadia dissolved in oxalic acid) is added directly to an alumina sol starting ingredient rather than to an alumina sol/magnesium acetate reaction mixture. It should also be noted in passing that the pH of the vanadia and the sol can be made almost identical and that in such cases one would not normally expect to precipitate the vanadia. However, in the practice of applicants' invention, a gel can in fact be formed with the vanadia and the alumina sol when the system is placed under applicants' 5 nanometer or less size constraints. This is quite unexpected. It should also be noted that, upon standing for about 30 minutes, applicants' vanadia-alumina mixture will form a hard gel in about 30 minutes. This phenomenon is to be contrasted with the fact that alumina sol, by itself, takes several months to form a gel. In any event, this variation of applicants' process can be effectively employed as part of applicants' overall process to produce spinels of especially high quality.

Finally, many metallic atoms, such as those of vanadium, also can be associated with the synthetic spinels produced by the methods of this patent disclosure by impregnation techniques known to the art rather than by actual inclusion in a spinel's crystalline lattice. Thus, by way of a more detailed example of such impregnation techniques, vanadium pentoxide $V_2O_5$, in oxalic acid, could be associated by impregnation with a $R^2O.R_2^{3+}O_3$ spinel after it has been calcined. The resulting vanadium impregnated spinel can then be re-dried (preferably at about 250° F. from about 60 minutes to about 240 minutes) and then recalcined (preferably for about 180 minutes at about 1350° F.). During the second calcination the oxalate ingredient will break down to $CO_2$ and steam which are each driven off as gases and thereby leaving the vanadium as a cation, $VO_2^+$. Synthetic spinels made by such impregnation techniques preferably will comprise from about 0.5 to about 4 percent vanadium by weight, with about 2 percent by weight being a particularly preferred proportion.

Other objects and/or advantages to applicants' process will be apparent from the following drawings and more detailed descriptions.

DESCRIPTION OF PREFERRED EMBODIMENTS

Preparation Of Comparative Synthetic Spinels

Figure 1:
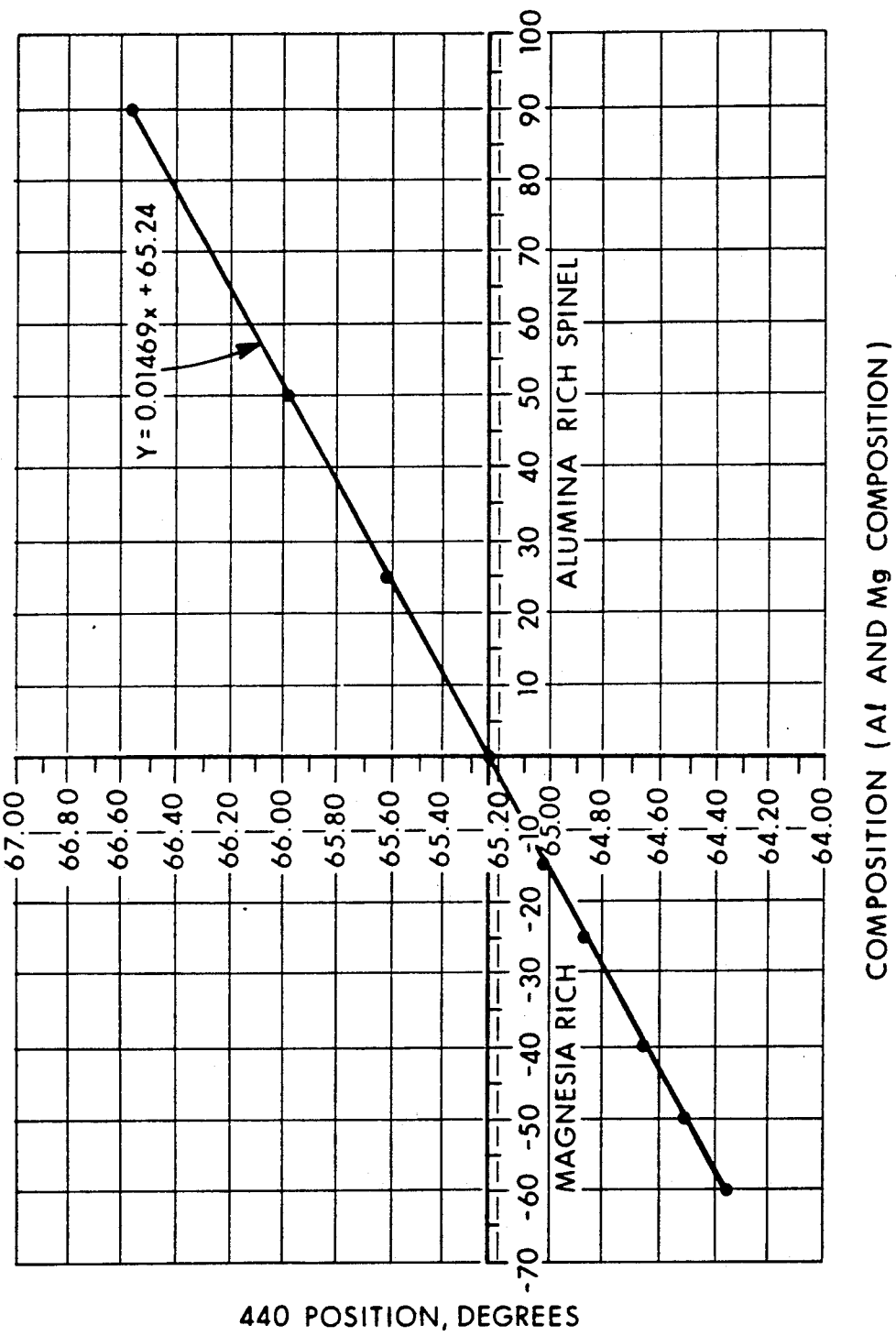
FIG. 1 depicts an x-ray diffraction 440 peak angular position as a function of magnesium to aluminum ratio (composition) in various synthetic spinel materials.

The following examples give further details regarding the experimental program used by applicants in establishing the efficacy of those spinels produced by the herein disclosed methods and then used as $SO_x$ capturing agents, especially in the context of such use in FCC units. Once again, $MgO.Al_2O_3$ will be used as the main comparative example not only because this species of spinel is so widely used as an $SO_x$ capturing agent, but also in order to keep focused on those issues most germane to this patent disclosure, e.g., applicants' particle size limitations vis-a-vis the size of particles used in production of prior art spinels. Thus, for example, the chemical identities of the ingredients used in forming several series of spinel $MgO.Al_2O_3$ materials were maintained while the sizes of the ingredient particles were systematically varied to determine the scope and sensitivity of applicants' particle size findings.

It should also be noted that in the ensuing discussion of experimental results, one of applicants' main criteria of "excellence" is the amount of magnesia found in a given spinel as well as the presence or absence of free magnesium oxide. Hence, if applicants were completely successful in getting all available magnesia into a spinel, they regarded the end product as a "magnesia-rich" spinel usually having about 50% "excess" magnesia. For example, the starting compositions of many of the Mg/Al spinels used in many of applicants' comparative experiments were fixed at an atomic ratio of 1.0. This was done simply by maintaining the ingredient composition of the spinels at $Al_2O_3$ 55.9% by weight and MgO 44.1% by weight in order to produce the desired Mg/Al atomic ratio of 1.0 and so that "particle size" was the variable responsible for any observed differences in the character of any resulting spinels.

Preparation Of Representative Starting Materials

EXAMPLE 1

As part of their overall research program, applicants prepared many different magnesium solutions which were thereafter used in the production of many of applicants' spinels and/or in the production of other spinels to which applicants' spinels were compared. One particularly preferred magnesium solution was formulated by adding 328 gms of glacial acetic acid to 440 ml of water. To the resulting mixture, 110 gms of magnesium oxide (obtained from Combustion Engineering, Inc. in the form of their MAGOX ® product) was slowly added. The mixture was then stirred until all of the magnesium oxide was dissolved. The pH of the resulting magnesium acetate solution was 3.6.

EXAMPLE 2

Many of applicants' most preferred aluminas (e.g., those having 2 nanometer particles, and often used in the form of sols) were prepared by the hydrolysis of aluminum alcoholates. Their crystalline structure is best characterized as that of the mineral boehmite (alpha alumina monohydrate). However, within this broad definition there is a whole host of solid aluminas and sols. Applicants' have extensively tested many of these materials in order to ascertain their efficacy in producing spinels and arrived at the following criteria for judging the suitability of a particular alumina for producing spinels.

Crystalline Form

One of the most preferred crystalline structure forms, as determined by x-ray diffraction, is an alpha alumina monohydrate of the type commonly referred to as boehmite or pseudo-boehmite. It should also be noted that applicants have found that alumina sols with 2 nanometer particles prepared from amorphous alumina do yield suitable magnesia spinels, but these are less preferred to those prepared from sols with a high proportion of crystalline alumina.

Crystalline Size

As previously noted, crystalline size is most conveniently measured by x-ray diffraction methods. However, because crystals are not always symmetrical, two values were often obtained depending on the plane along which the crystals are "viewed" by such x-ray diffraction methods. For example, applicants have found that certain aluminas having 2 nanometer diameters along a 020 plane had 4 nanometer diameters when viewed along a 021 plane. It should also be again noted in passing that where such differences exist—depending on the plane along which the measurements are made—applicants' 5 nanometer limitation should be applied to the longest linear diameter of the particle. Moreover, in those "special cases" where particles larger than 5 nanometers are employed, the particles must also be characterized by their possession of unequal lattice spacings along at least two such viewing planes (e.g., along the 020 plane and along the 021 plane).

Particle Size of a Liquid Sol

As previously noted in the discussion of electrophoretic measuring techniques, there are techniques for measuring the diameter of particles in a liquid sol which, unfortunately, are not generally useful in determining particle diameters in the "wet" context of a sol. As noted in previous passages of this patent disclosure, there is general agreement by those skilled in this art as to which techniques should be used in making particle "size" measurements; but there may be considerable divergence as to the interpretation of such measurements (e.g., those made by electrophoretic techniques). For example one laboratory may report a particle size in a liquid sol of 20 nanometers and another laboratory will report a size of 2 nanometers for "the same" material. Therefore, because of these uncertainties in the interpretation of certain measurements (and especially those requiring the use of eccentricity factors ($\epsilon$) to make accurate electrophoretic measurements), applicants prefer to use the crystalline size based on x-ray diffraction measurements wherever possible.

Dispersibility of the Alumina

In some cases it also may be of some importance to the successful production of applicants' spinels that an alumina be highly dispersible in an acid media because any alumina that remains as an undispersed solid, could have a potentially deleterious affect on the resulting spinel. For example, those aluminas that applicants have found most useful have dispersibilities of greater than 95% and most preferably greater than 98.5%. Such dispersibility can be determined by placing 10 grams of the alumina in 90 cc of 0.35% hydrochloric acid under intensive stirring for 10 minutes. In most cases, the resulting dispersion can be centrifuged for better dispersion and the dispersed part decanted. The residue is most preferably dried in a furnace and the dispersibility will be determined according to the following formula:

$$\frac{\text{Weight of Sample} - \text{Weight of Nondispersed Material}}{\text{Weight of Sample}} \times 100 = \% \text{ Dispersibility}$$

Representative Preparation for Spinels Having Two Metals In Its Crystalline Lattice

EXAMPLE 3

A 10% by weight alumina sol (1440 grams) of the type described in Example 2 was mixed with 873 grams of magnesium acetate containing 11% by weight MgO was prepared according to the methods described in Example 1. After a thorough mixing, the reaction mixture was spray dried and then calcined for 1 hour at 1350° F. The x-ray diffraction pattern for the resulting spinel (see FIG. 3 of this patent disclosure) showed a 2-theta value of 64.613. For reasons hereinafter more fully explained, the absence of a "shoulder region" in this x-ray diffraction—as opposed to the presence of such a "shoulder region" in FIG. 3—indicates that there is no free magnesium oxide in the spinel.

Preparation of Spinels Having Three Metals In Its Crystalline Lattice

The matter of introduction of "third metal" atoms ($.R^{2+}$, $.R^{3+}$, etc.) was also systematically considered in the context of applicants' "particle size" limitation (i.e., less than 5 and preferably less than 2 nanometers). This series of experiments showed that $.R^{2+}$, $.R^{3+}$, etc. atoms can be associated with $R^{2+}$, $R^{3+}$ atoms by their actual introduction into a spinel's crystalline structure. Examples 4 and 5 are representative procedures for producing such "three metal" spinels.

EXAMPLE 4

This example describes preparation of a $MgO \cdot Al_2O_3$ spinel using a magnesium acetate solution, a alumina composition comprised of 2 nanometer alumina particles prepared by the methods of Example 2 and a third metal-containing composition, e.g., a cerium solution. The alumina used was in the form of a sol. The sol, constituting 1440 gms, was mixed at high speed with 873 gms of magnesium acetate prepared according to the methods of Example 1. After mixing for 10 minutes the pH of the mixture was found to be 4.75. Ninety-four point six (94.6) grams of a cerium nitrate solution was then added to the resulting mixture. After the addition of the cerium nitrate, mixing was continued for an additional 2 minutes. The pH was again measured and found to be 4.7. The sample was then spray dried and the resulting material calcined for one hour at 1350 F. The x-ray diffraction pattern on the sample showed a 2-theta value of 64.458. The spinel was magnesia-rich and contained 53.1% magnesia. There was no discernable free MgO in this sample.

EXAMPLE 5

This example also gives preparation of a $MgO\ Al_2O_3$ spinel with a dispersible alumina with a 2 nanometer alumina particle size. Here, however, the alumina was in the form of a powder rather than a sol. The alumina was dispersed by mixing 591 ml of water with 18.9 gms of acetic acid. To this mixture 140 grams (dry basis) gms of the alumina powder was added. The resulting slurry was mixed at high speed for 20 minutes. At the end of this time the viscosity of the mixture had increased and the mixture was clear. To the resulting sol, a solution of magnesium acetate containing 17% MgO by weight was added. The magnesium acetate was prepared by dissolving 110 gms of MgO in a solution of 328 gms of glacial acetic acid and 210 ml of water. The mixture of alumina sol and magnesium acetate was then mixed at high speed for 10 minutes. To this mixture, 98 gms of cerium nitrate was added. After mixing for an additional 5 minutes the sample was spray dried. The spray dried sample was then calcined for one hour at 1350 F. The x-ray diffraction on the sample showed a 2-theta value of 64.429. The resulting spinel was magnesia-rich and contained 55.2% magnesia. The free MgO in this sample was effectively zero percent.

COMPARISONS TO MOST RELEVANT PRIOR ART SPINELS

Applicants conducted a great many tests aimed at comparing the spinels produced by the methods of this patent disclosure with spinels produced by various prior art methods. These comparative tests were quite extensive. Therefore, in the interest of brevity, applicants will only present data obtained in comparing the process of this patent disclosure with the process which applicants regard as the "closest prior art" namely, the process disclosed in U.S. Pat. No. 4,728,635. The results of such comparisons are summarized in the ensuing discussions regarding differences in ingredients, particle sizes, particle surface area and pH values of reaction mixtures. To this end, the following comparison system was employed:

|  | Applicants' Process | The 635 Patent's Process |
|---|---|---|
| Particle Size | AL$_2$O$_3$ (2 nm) | Al$_2$O$_3$ (>1,000 nm) |
| Other Particle Attributes | MgO (no surface area requirement based on use of ionic form) | MgO (requirement for high surface area of particle) |
| Identity of Acid Employed and Critical Nature of That Acid Identity | Acetic Acid (non critical) | Formic Acid (critical) |
| Preferred pH For Reaction Mixture | 3.5-6.5 | 7.0-10.5 |
| Process Goals | Complete Absence of Free Magnesium Oxide | Desired Presence of Free Magnesium Oxide |

Alumina

The 635 Patent expresses a strong preference for use of a gelled alumina. Alumina used in such a process would be in the form of coalesced particles, which when dispersed, would have particle sizes of about 200 nanometers. However, as indicated in the above comparison system, applicants estimate that the particle sizes of such gelled alumina is greater than 1,000 nanometers. Therefore, applicants' comparative approach with regard to this particle size parameter was to use aluminas, in the form of highly dispersed sols, whose alumina particle sizes were less than 5 nanometers, or, in other cases, less than about 2 nanometers. The resulting spinels were then compared to spinels produced by a comparable process using starting materials that were gelled aluminas having particle sizes in excess of 1,000 nanometers. In any event, it was found that use of applicants' size limitation produced spinels having extremely enhanced capabilities as SO$_x$ capture catalysts.

Magnesia

The 635 Patent strongly emphasizes use of a magnesia having a high surface area and goes to some lengths to show that poorer spinels result when a magnesia having a lower surface area is employed. By way of comparison, applicants ascertained that their process is not dependent upon their ingredient particles having a large "surface area"; and, in fact, applicants' process is more effective when it employs somewhat opposing "size" concepts. For example, one of applicants' more preferred approaches is to dissolve the magnesia in acetic acid so that the magnesium is present as an ion, and thus is present in "atomic dimension sizes" (i.e., sizes on the order of less than about 50 angstrom units, and preferably less than 20 angstrom units) and, hence, is in more proximate association with any other species with which it may be contacted. In other words, for the most part, applicants' process is better carried out when the "particles" of an original reaction mixture are in fact ions rather than the much larger (i.e., larger than 5 nanometers) particles one would associate with the 635 patent's requirement for large, "undissolved", magnesia particles. That is to say that applicants' use of ions was for the purpose of providing the most intimate contact possible between the magnesia and the alumina rather than for the purpose of producing actual solid "particles" having large surface areas. In any event, and regardless of the underlying rational behind the use of each of these two concepts, the two sets of goals, are to some degree in opposition to each other. That is to say that a further distinction in the goals of these two processes resides in the fact the 635 patent finds virtue in the use of alumina particles selected on the basis of their having large surface areas. Applicants, on the other hand would select their alumina particles—indeed all of their ingredient particles—on the basis of the particle's ability to be reduced to a size of 5 nanometers (or less) and/or its ability (e.g., that of boehmite) to be reduced to an ultimate crystallite size of 5 nanometers (or less). Again, in those cases where certain particles, which are originally larger than 5 nanometers, are employed in the practice of this invention, applicants' selection process will also be guided by the fact such larger particles also should have crystals characterized by unequal lattice spacings along at least 2 of the 3 crystalline axes. In other words this criterion also can serve as a guide in predicting a given particle species' ability to attain ultimate crystallite sizes of 5 nanometers or less.

Acid

The 635 patent uses formic acid extensively. This particular selection is, however, totally inconsistent with applicants' entire approach because the apparent purpose of the formic acid used in the process disclosed in the 635 patent is to provide a low pH in order to gel the alumina and then to control their reaction mixture's pH to a preferred 8.5-9.0 range when a large excess of magnesia (pH-10.5) is used. Thus, another difference in approach, vis-a-vis applicants' process, follows from the fact that formic acid will react with the magnesia to form magnesium formate—which is highly insoluble compared to magnesium acetate. Again this stands in sharp contrast to applicants' process which, most preferably, seeks to maintain its magnesium as an ionic species. For example, applicants developed some preference for certain acids, such as acetic acid, for pH adjustment purposes, simply because these acids are particularly effective in keeping ingredients such as magnesia in solution (in the form of $Mg^{2+}$ ions) rather than precipitating them as would be the case with a similar use of formic acid.

pH

As previously noted, the 635 Patent expresses a strong preference for pH conditions in the basic region of the pH scale (i.e., in the 7.0-10.5 pH range with a particularly strong preference stated for the 8.5-9.0 pH range) for its reaction mixtures. By way of contrast, applicants have found that their reactions should be carried out in acidic (e.g., pH values between about 6.5 and about 3.5) conditions. Again, applicants' most preferred pH is about 4.0. The 635 patent also expresses a need to employ "a basic, alkaline earth metal-containing composition" (emphasis added) in formulating its reaction mixture. Here again, applicants process stands in direct contradistinction to this requirement in that it employs acidic alkaline earth metal-containing compositions (e.g., the magnesium acetate composition of Example 1 which has an extremely acidic 3.6 pH value) in order to gain the acidic conditions needed for practice of the herein disclosed processes.

Process Goals

Aside from the differences in the methods for making the spinels described above, it should be noted once more that the 635 patent is concerned with making a spinel "combined with a free alkaline earth metal oxide" (e.g., MgO) representing up to about 30% by weight of the resulting spinel. As previously discussed, applicants' approach is to totally eliminate if possible, or to at least minimize, the presence of such free alkaline earth metal oxides (e.g., magnesia) in their spinels and/or to otherwise get as much of such materials (e.g., magnesia) as possible into the spinel's crystalline lattice structure—in other words, to produce a "magnesia-rich" spinel. Again, applicants believe that any free magnesia which may be present forms magnesium sulfate and that the presence of this particular material inhibits the performance of a magnesia-rich spinel by, among other things, interfering with the spinel's susceptibility to regeneration.

Many tests were conducted in order to compare applicants' spinels to various prior art spinels from the point of view of susceptibility to regeneration and/or $SO_x$ absorption capabilities over extended periods of time wherein the spinel must be used and regenerated many times over. The results of one series of such regeneration tests are summarized in Table I which is given and thoroughly discussed in a later section of this patent disclosure. For now, however, suffice it to say that, in general, applicants' regeneration tests indicated that spinels having more than about 5% by weight of complex compounds were greatly inferior with respect to their ability to undergo repeated regenerations.

Other pH Related Comparative Experiments

As part of their comparative studies, applicants also tested the sensitivity of the operating parameters of their process vis-a-vis certain counterpart parameters in various other processes. For example, some preferred mixtures of peptized alumina and MgO taught in the 635 patent had a pH of 8.5. Therefore, as part of their comparison tests, applicants added concentrated ammonium hydroxide to raise the pH to the more preferred 9.0 pH level called for in the 635 patent. The resulting spinel was "alumina-rich" and contained 22% excess alumina. Applicants then made a similar run in which the pH was not changed to 9.0. The resulting material gave a much poorer result. The spinel was, again, alumina-rich and contained 27% excess alumina. This experiment served to confirm that, as the 635 patent admonishes, it is extremely important to the 635 process to maintain the pH of its reaction mixture in the recommended 8.5-9.0 pH range. Again, by way of contrast, counterpart tests showed that applicants' process very decidedly works best in the acidic regions of the pH scale and especially those in the range of 3.5 to 6.5 and most preferably at a pH of about 4.0.

Test Methods And Criteria Used To Establish Applicant's Invention

As previously noted, applicants employed several specific criteria to discern whether or not (and/or to what degree) synthetic spinels produced by the herein disclosed processes and/or those made by certain prior art processes are in fact free of discernable complex compounds of $R^{2+}$ and $R^{3+}$. For example, in the case of the production of spinel $MgO.Al_2O_3$, such criteria were employed to determine whether or not a spinel was free of the complex compounds stoichiometric spinel and magnesium oxide. Once again, by use of expressions such as: "free of discernable complex compounds", applicants wish to convey the idea that such complex compounds can be discerned through the use of such varied techniques as x-ray diffraction, detection of heats of reaction, micro-quantitative analysis coupled with statistical procedures and like methods for determining if such complex compounds are in fact present in a spinel.

X-Ray Diffraction

The techniques of X-ray diffraction are of course well known. Hence, for the purposes of this patent disclosure, it need only be briefly noted that the orderly, serried ranks of atoms in a crystalline lattice can be viewed at various angles in which files of atoms line up with a clear "avenue of sight" along certain cutting planes. That is to say that all crystals, in three dimensions, can be "viewed" from a standpoint of 3 different axes; and identification of such avenues can be made by counting atoms spaced from an arbitrary point of origin along each of the three axes. Such a plane can be identified by 3 designators, e.g., A, B, C, or X, Y, Z, etc. having certain values 2, 5, 7, or 4,4,0 (abbreviated "440"), etc. In conducting x-ray diffraction tests, the subject crystal is rotated until that plane is observed which permits X-rays of an appropriate wavelength to be diffracted by the lattice and, consequently, exhibit a detectable "peak" for such X-rays. The critical measurement for the x-ray diffraction peak plane is the angle of rotation of the crystal. In practice, because of certain mathematical relationships between these variables, such a peak is observed as an intensity ordinate plotted against an abscissa of 2 theta, the angle of rotation. Thus such x-ray diffraction patterns can be thought of exhibiting certain significant lines which correspond to the angle of rotation which is often designated by notations such as interplanar spacing d(A) or 2-theta-d spacing or 2-theta ($\theta$) or simply a "2-theta value" as indicated in FIGS. 2, 3, 4A and 4B of this patent application.

In any event, x-ray diffraction measurements of this type were made by applicants in order to test the degree to which "undesirable" compounds were associated with a given spinel's crystalline lattice structure. That is to say that spinels prepared by the processes of this patent disclosure were studied in their own right and/or compared, on a x-ray diffraction basis, to those made by other known production procedures and/or compared to those obtained from commercial sources. To begin, FIG. 1 plots as ordinate Y, the angular position of a single peak of an x-ray diffraction 440 plane as a function of a magnesium to aluminum ratio in a $MgO \cdot Al_2O_3$ spinel. This was done in the manner taught in the 070 patent and said 070 patent is incorporated by reference into this patent disclosure. It also should be noted that in the function plotted in FIG. 1, X equals $\alpha \times 100$ all divided by the expression $1+\alpha$ wherein $\alpha$ is calculated by the relationship for a solid solution of an alumina-rich spinel having the molecular formula: $MgO[1+\alpha] \cdot Al_2O_3$ wherein $\alpha$ is greater than zero. The plot is depicted over the range of X from minus 60 (corresponding to magnesium-rich spinel having a magnesium oxide to alumina oxide molecular proportion of 2.5:1), through a value of 65.24 (i.e., an angular position corresponding to the equimolecular ratio of magnesium oxide to aluminum oxide, which is true both for a solid solution of this ratio and for the complex compound stoichiometric spinel, $Mg Al_2O_4$) to a value of X equal to 90 (corresponding to an aluminum-rich spinel having a magnesium oxide to aluminum oxide molecular proportion of 1:10). The plot depicted in FIG. 1, which can be maintained in moderate extrapolation in either direction, obeys the linear function $Y=0.0147X+65.24$ such that the Y axis intercept corresponds to the constant term of the right hand member (i.e., the expression on the right of the equal sign) which is 65.24 degrees for the value of X equal to zero.

FIG. 1 is important to the development of this patent disclosure because it shows that a x-ray diffraction 440 angular peak position does shift, varying continuously and linearly, with continuous variation in the magnesium to aluminum ratio of various possible spinels. However, a secondary peak such as that designated as the "shoulder region" in FIG. 2 will appear at a value corresponding to the presence of "free" excess magnesium oxide or "free" excess aluminum oxide. Such peak positions are independent of the magnesium to aluminum ratio which is only reflected by the relative intensity of respective x-ray diffraction 440 peaks. Thus, the ordinate in FIGS. 2, 3 and 4A and 4B is simply labeled "intensity." In any event, FIG. 1 vividly depicts the "regularity of distribution" in homogeneous crystals of "natural spinel" and in homogeneous crystals of synthetic spinels. Note also that the angle of rotation corresponding to the x-ray diffraction 440 peak position occurs with the plane of repetitive ranks of atomic distribution at lattice dimensions that change under these circumstances as a continuous linear function of continuous linear variation of the relative proportions of magnesium oxide to aluminum oxide. Therefore, this function includes one point wherein the variable ratio occurs at the 1:1 ratio of one molecule of each oxide: MgO and $Al_2O_3$ (or in a 1:2 magnesium to aluminum atomic ratio), regardless of whether the MgO and $Al_2O_3$ are chemically bonded or in solid solution. However, it is the appearance of two peaks, in whatever relative intensity, which signal the occurrence of a chemical formation of complex compounds (as later demonstrated in FIGS. 2, 4A and 4B) such as stoichiometric spinel and leftover amounts of a "free" ingredient such as "free" magnesium oxide.

Figure 2:
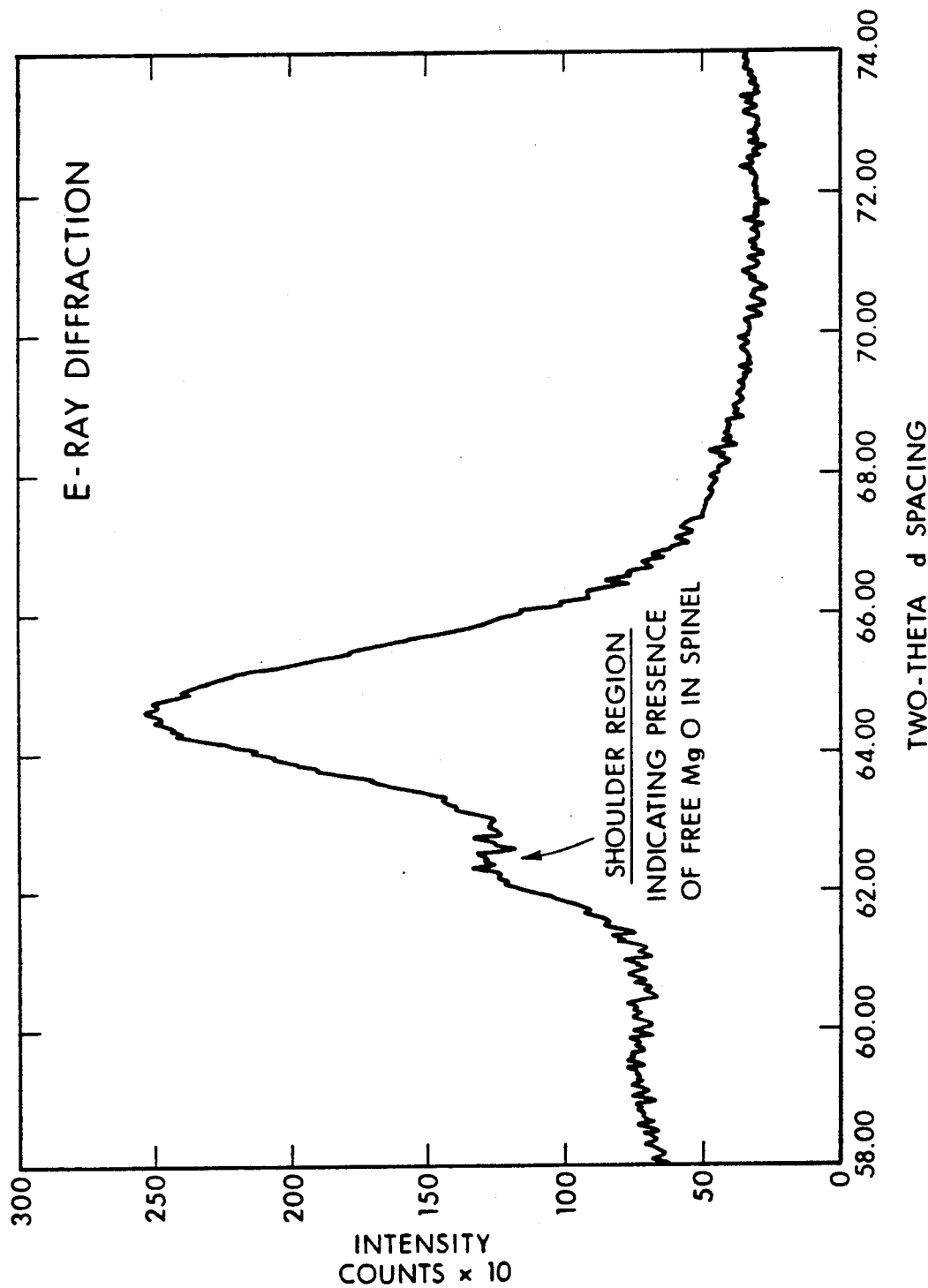
FIG. 2 depicts a plot of a x-ray diffraction 440 peak angular position as a function of angular rotation for a solid solution of a synthetic spinel made according to the teachings of this patent disclosure.

To further illustrate the presence of "free" magnesium oxide in a spinel, FIG. 2 depicts a plot of an x-ray diffraction 440 peak intensity of an angular position for a spinel which does in fact contain free magnesium oxide. The presence of such free magnesium oxide in the spinel manifests itself in the form of the "shoulder region" indicated on FIG. 2. Again, the ordinate value of the secondary peak or "shoulder region" of FIG. 2 only reflects the relative amount of excess magnesium oxide.

Figure 3:
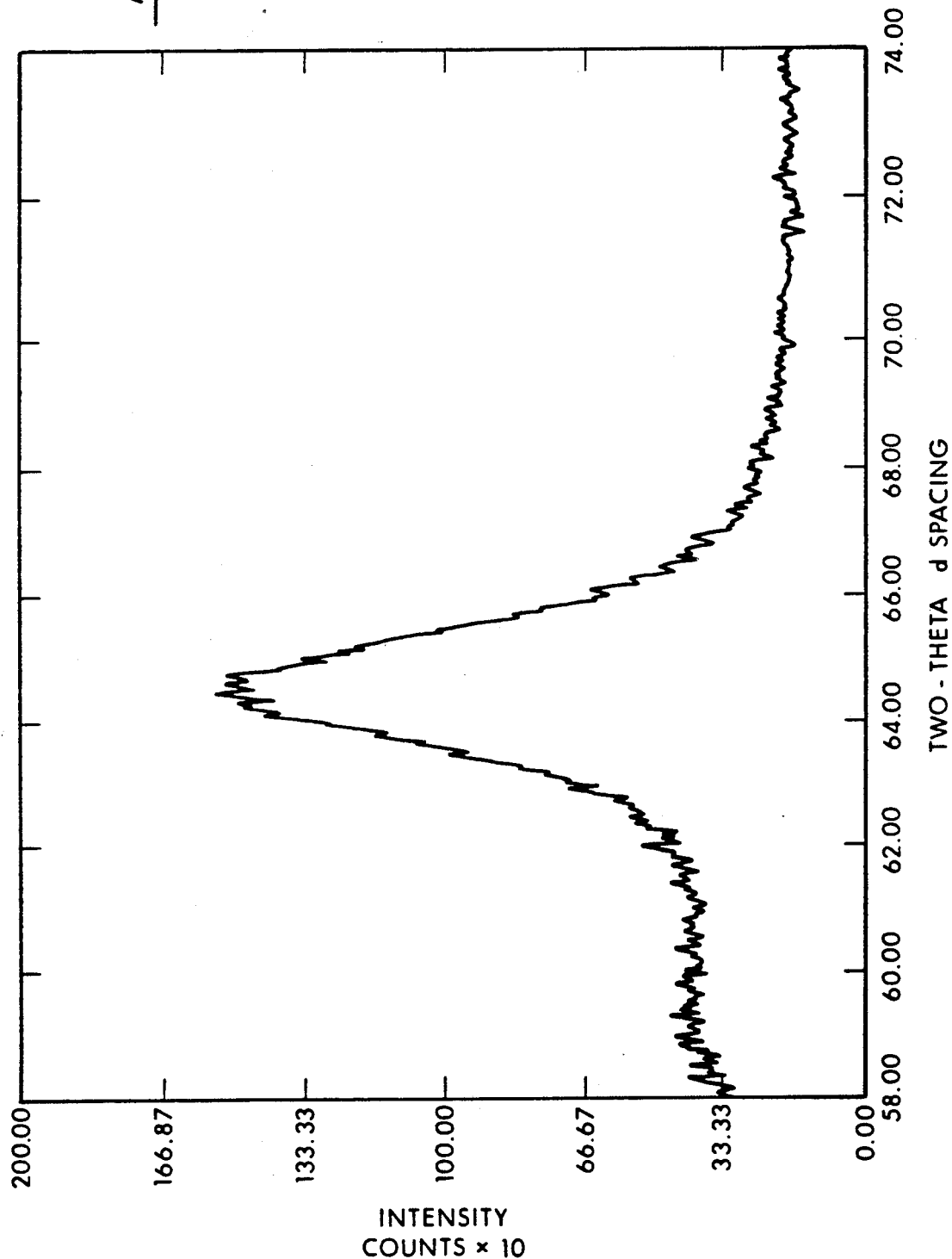
FIG. 3 depicts a x-ray diffraction 440 peak angular position for a spinel having a free magnesium oxide component.

By way of further comparison, FIG. 3 demonstrates the x-ray diffraction of a spinel (such as one prepared by the procedure of Example 3) which is free of complex compound materials in its crystalline spaces. Consequently, it shows for its x-ray diffraction 440 intensity peak position, a single value of 2 theta. Again, this single peak is to be contrasted with the "shoulder region" of FIG. 2 or with the even more pronounced dual peaks shown in FIGS. 4A and 4B.

Figure 4A:
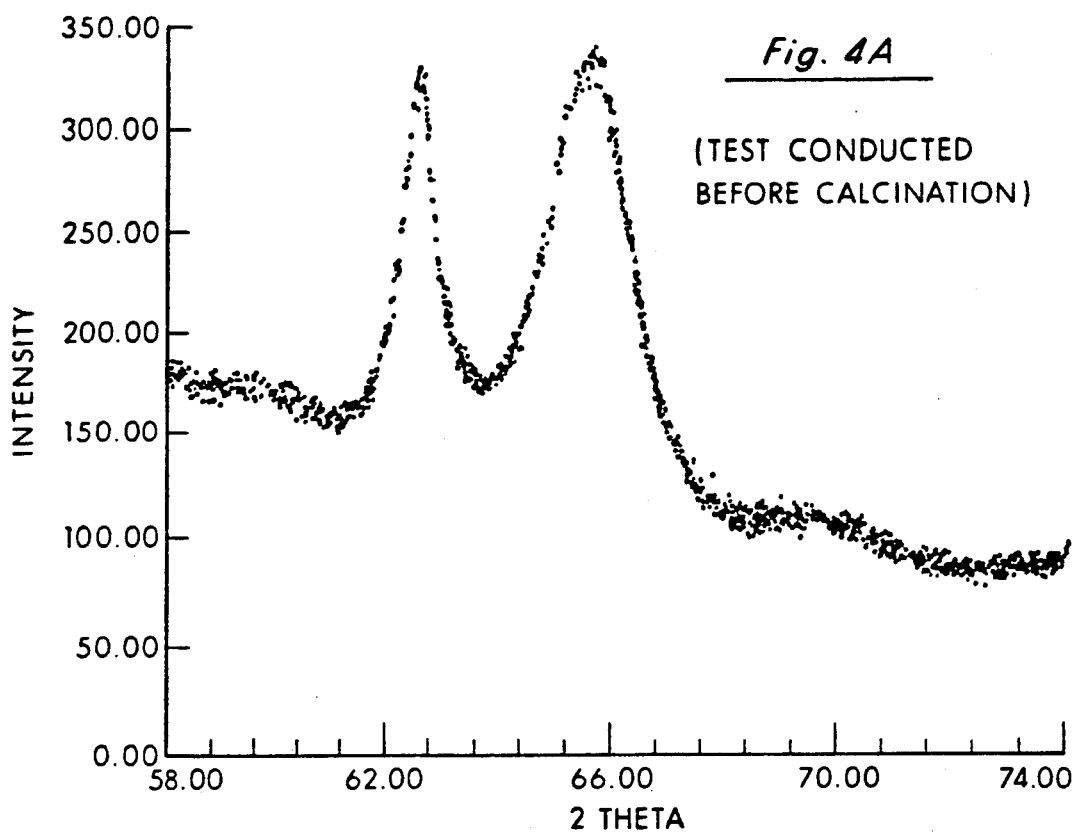
FIGS. 4A and 4B show, respectively, 440 peak angular positions for a spinel containing stoichiometric spinel and free magnesium oxide shown before calcination (FIG. 4A) and after calcination (FIG. 4B).
Figure 4B:
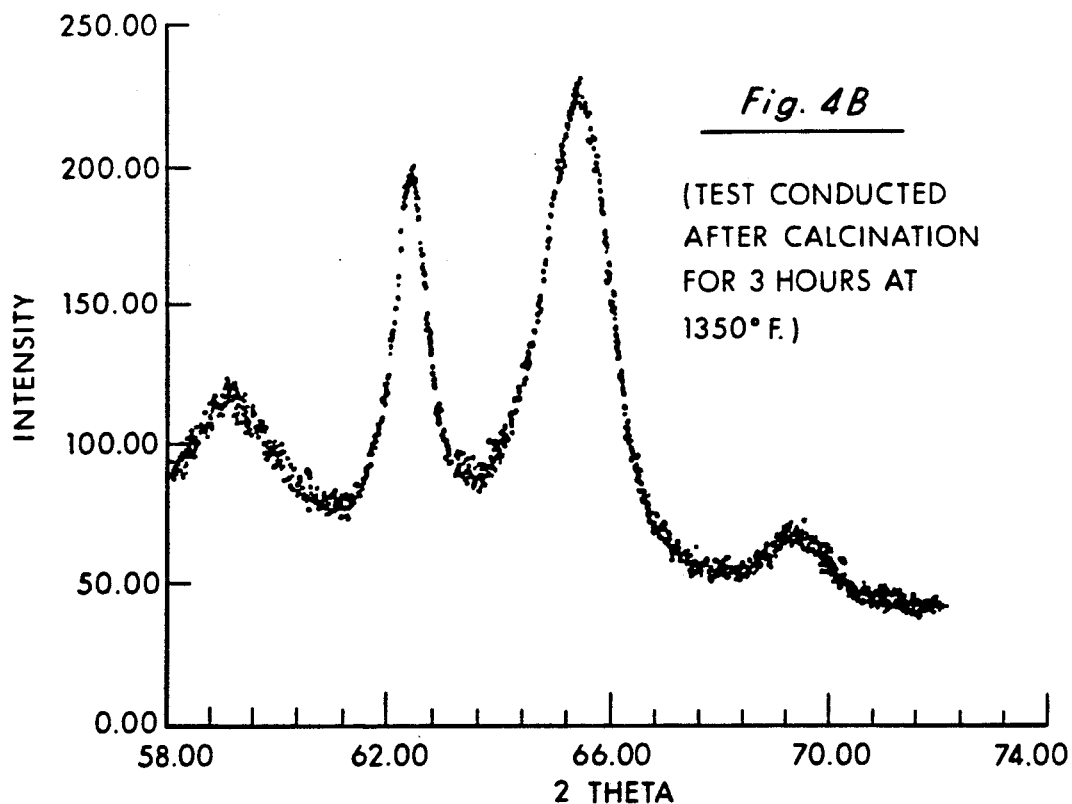

FIGS. 4A and 4B are x-ray diffraction patterns for a spinel crystal in which there are two distinct regions (or phases) of undesired materials e.g., those of a stoichiometric nature. Thus, in FIG. 4A, one 2 theta peak—at a 2 theta value of 65.2—corresponds, in this case, to stoichiometric spinel, while the second peak—at a 2 theta value of 62.5—corresponds to "enclaves" of free magnesium oxide. In other words, at the order of magnitude of the X-ray wavelengths employed, such 440 count of atoms in this particular crystal structure will find an avenue peak angle, distinct and discernable for different portions of the crystal, corresponding to stoichiometric spinel and to free magnesium oxide. Thus FIGS. 4A and 4B depict, even more graphically than FIG. 2, the consequences of making spinels "improperly", i.e., not according to the less than 5 nanometer "size dictates" of this patent disclosure. FIGS. 4A and 4B also serve to compare a x-ray diffraction on a given sample before calcination (FIG. 4A) and after calcination (FIG. 4B). This comparison confirms applicants' findings that once a material having free magnesium oxide and stoichiometric spinel are introduced into applicants' production process, recovery of a "complex compound free" spinel cannot be achieved (nor reachieved if it were originally there) as a result of calcination. This inability follows from the occurrence of the previously noted thermodynamically favored reactions. It should also be noted that the relative intensities of the two peaks of FIGS. 4A and 4B demonstrate that the very large excess of magnesium compound employed in these particular formulations resulted in free magnesium oxide of only the excess amount to be expected over that amount dictated by the stoichiometric ratio.

As yet another means of expressing the advantages of applicants' spinels, Table I shows the results of certain comparative tests made between a spinel produced by applicants' process and designated as "applicants' spinel" (it might also be noted in passing that this particular spinel had only 15% "excess" magnesium oxide) and various other spinels, i.e., spinels A and B as well as various "non-spinel" SO catalysts, i.e., those indicated as items C and D. The spinels, A and B were not made according to applicants' particle size dictates. It should also be noted in passing that, as is generally indicated in Table I, these tests indicated that "spinel" type additives are far superior to "non-spinel" additives with respect to $SO_x$ catalytic activity.

A few more words of explanation may help in interpreting the data presented in Table I. The "Emissions" are expressed as the $SO_x$ (actually a mixture of sulfur dioxide and sulfur trioxide) emitted per thousand barrels of fresh feed stock material processed in a FCC test unit. For example, the data for applicants' material shows that over a 30 hour time period on stream, the FCC unit emitted an integrated quantity of 17 kilograms of $SO_x$ per thousand barrels of fresh feed stock material. It should also be noted in passing that all of the various $SO_x$ catalysts tested—applicants' catalysts as well as catalysts A, B, C, D—were employed in concentrations of about 2% of the total catalysts inventory used in the FCC unit. Similarly, the expression "Baseline Emissions 150 Kg/mbbl" is the designation for a rather arbitrary, but widely used, industry standard meaning that, for comparative purposes, one would expect to get 150 kilograms of $SO_x$ per thousand barrels of feedstock if no $SO_x$ catalyst whatsoever were employed in the FCC catalyst inventory. In any case, the data shows an 89% reduction in $SO_x$ emissions for applicants' spinel versus 83% for the other spinels. In the realm of $SO_x$ catalyst performance, this represents a very significant improvement. Again, the data also demonstrate the large advantage of spinels in reducing $SO_x$ vis-a-vis non-spinel additives.

TABLE I

| ADDITIVE | TYPE | EMISSIONS $SO_x$, KG/MBBL | % REDUCTION |
|---|---|---|---|
| A | Spinel | 25 | 83 |
| B | Spinel | 25 | 83 |
| Applicants' Additive | Spinel | 17 | 89 |
| C | Non-Spinel | 40 | 73 |
| D | Non-Spinel | 72 | 52 |
| Baseline Emissions | | 150 | 0 |

Other Test Methods and Criteria

Thermodynamic Methods

There are certain well known procedures of quantitative analysis which are capable of determining, within predictable limits of accuracy, the atomic ratios of the constituent elements of an unknown chemical. Such analyses will, however, generally fail to provide information as to the distribution and function of electrons planetary to the elemental nuclei of a crystalline lattice, and such information is intrinsic to the notions of chemical reaction and bonding. Therefore, in the absence of thermodynamic evidence of energy parameters—and their changes—workers in this art would be unable to distinguish between, say, a spinel of small integral atomic ratios in true stoichiometric chemical bonding, and a homogeneous, crystalline, solid solution of metallic oxides which, within the accuracy of analysis, has the identical atomic ratios. The main point here, however, is that such distinctions are useful, but generally not necessary to the applicability of the methods of this patent disclosure, since, for reasons previously explained, a single value in a continuous linear variation of, say, a magnesium to aluminum atomic ratio, can produce the previously discussed criterion of a single x-ray diffraction peak such as the 440 peak angular position depicted in FIG. 3.

In any event, if employed, say in the case of production of spinel $MgO.Al_2O_3$, a thermodynamic criterion of success would follow from the fact that mixtures of MgO and $Al_2(O_3)$ and/or other oxides are known to undergo certain spontaneous reactions, e.g., those of equimolecular proportions of magnesium oxide and aluminum trioxide to produce stoichiometric spinel. That is to say that for all the reasons previously noted, unless such reactions are deliberately forestalled, the previously discussed spontaneous thermodynamic considerations will result in a spontaneous reaction of equimolecular ratios of the ingredients and leave, as separate, non-homogeneous distributions, complex compounds such as free magnesium and stoichiometric spinel rather than a homogeneous distribution, in the resulting solid solution. Again, this thermodynamic consequence also implies that the X-ray diffraction evidence of the type shown in FIGS. 4A and 4B will also be found. Moreover, the products of reaction of such materials are known to have some of the same characteristics as a homogeneous distribution of metallic atoms in their crystalline lattices. Indeed, as was previously noted, such chemical reaction products would successfully fulfill the criterion of a singular angular peak for, say, a x-ray diffraction 440 plane if the material were only stoichiometric spinel.

Analytical Homogeneity

The theoretical idea of "lattice spacing" within such crystalline structures also is important to this disclosure and thus merits further clarification. As mentioned previously, elements in spinels are distributed in regular crystalline lattices in various regular patterns of crystal "habits" along three principle axes which are not necessarily mutually perpendicular (orthogonal), but which are not co-planar either. Moreover, the spacings of elements along these axes can be calculated and counted. Consequently, the criterion of "homogeneous" distribution is ultimately based on the volume within such a lattice which is encompassed by the smallest number of such spaces along each of the three axes required to establish one unit of a consistent repeating pattern, in repeating sequence, of all chemical elements present therein. Clearly, this will depend upon the number of such elements and their relative numerical compositional ratios. The point here is simply that zones of a crystal which fail to conform over larger volumes to this repeating pattern must be considered as "enclaves" of another material and, therefore, constituting "non-homogeneity."

Consequently, further corroborating evidence of the quality of synthetic spinels made according to the teachings of this patent disclosure also can be obtained by careful quantitative analysis of successively smaller samples of crystals, down to microgram sizes. Under such conditions—which are usually associated with dimensions of a few Angstrom units—a true solid solution will have the same composition as a much larger quantity of the same material. This same composition criterion can be contrasted to the case wherein such small samples will vary in composition due to the presence of free magnesium oxide and stoichiometric spinel. Hence, smaller and smaller samples will eventually reveal the presence of enclaves or zones of concentration of undesirable materials within the spinel. Thus, micro-quantitative analysis will eventually demonstrate any inequalities of chemical composition due to the presence of "enclaves" of such materials if smaller and smaller portions, down to sizes of a few lattice spacings, are not identical with the proportions of the original, gross sample. In any event, for purposes of this patent disclosure, the number of lattice spacings required to establish a homogeneous solid solution will be that number along the 3 axes required to establish a repetitive pattern for the ratios of molecules employed.

Therefore, in the application of the herein disclosed processes, and especially in their application to large scale manufacturing operations, quality control samples could be taken and values of the standard deviation subjected to statistical student T tests in order to determine a benchmark value of absolute departure to be expected as a measure of departure from "homogeneity." Thereupon, spot micro-quantitative analysis for properly formed crystals in solid solution would not be permitted to have a substantially greater value of standard deviation.

As a final thought regarding the application of test procedures and/or comparisons, it might be said that the success of applicants' process in making spinels which are substantially free of undesired complex compounds could be judged on the basis of any one, or all, of the previously noted criteria, namely: (i) the occurrence of a single angular peak for the value of $R^{2+}/R^{3+}$ ratio corresponding to continuous linear variation, (ii) a value of standard deviation of micro-quantitative analyses which will not substantially differ from those obtained for large samples, and (iii) neither the release nor the absorption of energy, nor change of free energy of formation (in the course of processing) which would indicate the occurrence of a chemical reaction. Moreover, the results of these tests can be employed to describe the products produced by applicants' processes.

In any event, and regardless of the tests used to prove their efficacy, the processes disclosed herein are capable of producing catalysts characterized by their high $SO_x$ activity, long life, ease of regeneration, suitability to large scale production, low costs, versatility of formulation and increased attrition resistance. All of these qualities make the resulting synthetic spinels especially attractive as sulfur oxide control agents.

Thus, while our invention has been described with respect to various scientific theories, specific examples and a spirit which is highly influenced by our 5 nanometer limitations, it is to be understood that this invention is not limited thereto and should be limited only by the scope of the following claims.

Thus having described our invention, what is claimed is:

1. A process for making a synthetic spinel having the general formula $R^{2+}O \cdot R_2^{3+}O_3$, said process comprising:
   (1) mixing, to a homogeneous consistency: (i) a composition of $R^{2+}[A]$ ("the $R^{2+}[A]$ composition") having a $R^{2+}[A]$ compound whose chemical particles are in a size range from molecular size to particles having average diameters not greater than about 5 nanometers, (ii) a composition of $R^{3+}[B]$ ("the $R^{3+}[B]$ composition") having a $R^{3+}[B]$ compound whose chemical particles are also in a size range from molecular size to particles having average diameters not greater than about 5 nanometers, and mixed such that the starting ratio of $R^{2+}$ atoms to $R^{3+}$ atoms is from about 0.5 to about 1.25 and (iii) such amounts of a liquid medium necessary to produce a total mixture having a pH from about 3.5 to about 6.5 and wherein the liquid medium constitutes from about 50 to about 90 weight percent of said total mixture and wherein: (i) $R^{2+}$ is a first metallic atom having a first, positive, oxidation state, (ii) $R^{3+}$ is a second metallic atom having a second, positive, oxidation state higher than the first positive oxidation state of the first metallic atom, and (iii) the $R^{2+}[A]$ compound is introduced to the $R^{3+}[B]$ compound in the form of a $R^{2+}[A]$ composition having a pH from about 3.5 to about 6.5 and [A] and [B] are nonmetallic atoms which each carry a net negative charge when respectively chemically bonded to the $R^{2+}$ and $R^{3+}$ metallic atoms and which, when subjected to prolonged heating in the presence of oxygen at elevated temperatures of calcination, will form gaseous oxides of the nonmetallic atoms of [A] and [B];
   (2) spray-drying the total mixture under conditions such that: (i) the liquid medium is flashed to a gaseous state at such a rate as to arrest migration of the $R^{2+}$ [A] compound and the $R^{3+}$ [B] compound through the liquid medium, (ii) segregation of the $R^{2+}$ [A] compound and the $R^{3+}$ [B] compound into discrete enclaves within a resulting synthetic spinel is precluded and (iii) finely divided, solid, particles are obtained wherein the starting ratio of $R^{2+}$ atoms to $R^{3+}$ atoms of the total mixture is substantially maintained in said particles; and
   (3) calcining the finely divided, solid, particles under conditions which produce crystals of a solid solution of $R^{2+}$ oxide ($R^{2+}O$) and $R^{3+}$ oxide ($R_2^{3+}O_3$) having a range of molecular ratios of $R^{2+}O$ to $R_2^{3+}O_3$ from about 1.0 to about 2.5 and drive off, as gases, substantially all other elements present in the crystal (i.e., other than those elements contained in the $R^{2+}O$ and in the $R_2^{3+}O_3$) and thereby producing a synthetic spinel which contains no more than about 5% by weight complex compounds of $R^{2+}$ and $R^{3+}$.

2. The process of claim 1 which further comprises desiccating the particles resulting from the spray drying at a temperature higher than the boiling point of the liquid medium for a period from about 0.2 hours to about 24.0 hours in order to remove any residual amounts of the liquid medium and thereby obtaining, in the form of a powder, anhydrous particles which still maintain the starting ratio of $R^{2+}$ atoms to $R^{3+}$ atoms.

3. The process of claim 1 wherein the non-metallic atoms [A] and [B] are each covalently linked combinations of nonmetallic atoms; and wherein $R^{2+}$ is a metal selected from the group consisting of magnesium, zinc, iron and manganese, $R^{3+}$ is a metal selected from the group consisting of aluminum, iron, cerium, manganese and lanthanum, [A] is a combination of nonmetallic atoms selected from the group consisting of nitrate, acetate ethylate, alkoxide, [B] is a combination of nonmetallic atoms selected from the group consisting of nitrate, oxide, acetate, chromate, hydroxide and alkoxide and the liquid medium is selected from the group consisting of water, alcohols having carbon chains containing up to 20 carbon atoms, acetone and ether.

4. The process of claim 1 wherein the $R^{2+}[A]$ compound is a magnesium acetate solution having a pH of about 4.0 and the $R^{3+}[B]$ compound is an alumina sol whose alumina particles have average diameters of about 2 nanometers and which are dispersed through the use of an acid selected from the group consisting of acetic acid and nitric acid.

5. The process of claim 1 wherein a composition containing a compound .$R^{2+}$[C] is mixed with the $R^{2-}$[A] and $R^{3+}$[B] compositions in order to form a spinel having a crystalline lattice wherein a portion of $R^{2-}$ atoms are replaced by .$R^{2-}$ atoms.

6. The process of claim 1 wherein a composition containing a cerium compound Ce[E] is mixed with the $R^{2-}$[A] and $R^{3-}$[B] compositions as part of the total mixture.

7. The process of claim 1 wherein a composition containing a vanadium compound V[E] is mixed with the $R^{2-}$[A] and $R^{3+}$8 B] compositions as part of the total mixture.

8. The process of claim 1 wherein the calcining is carried out in a temperature range between about 1,000 degrees Fahrenheit and about 1,950 degrees Fahrenheit for from about 60 minutes to about 240 minutes.

9. The process of claim 1 wherein additional amounts of a liquid medium are added in order to bring the liquid medium of the total mixture to the 50 to 90 weight percent.

10. The process of claim 1 wherein production of the total mixture is accompanied by a vigorous mixing action to promote a uniform distribution of the $R^{2-}$[A] and $R^{3-}$[B] compositions in the total mixture.

11. The process of claim 1 wherein a gas evolution agent is added to the total mixture before said mixture undergoes spray drying.

12. The process of claim 1 wherein a viscosity agent selected from the group consisting of starch and gum arabic is added to the total mixture before it undergoes spray drying.

13. The process of claim 1 wherein the pH of the total reaction mixture is adjusted by the use of an acid.

14. A process for making a synthetic spinel having the general formula Mg O.$Al_2O_3$, said process comprising:
  (1) mixing, to a homogeneous consistency: (i) a liquid composition of magnesium (Mg[A], "the magnesia") having a Mg[A] compound whose chemical particles are in a size range from molecular size to particles having average diameters of no more than about 5 nanometers, (ii) a liquid composition of aluminum (Al[B], "the alumina") having an Al[B] compound whose chemical particles are also in a size range from molecular size to particles having average diameters no more than about 5 nanometers, and mixed such that the starting ratio of magnesium atoms to aluminum atoms is substantially from 0.5 to 1.25 and (iii) such amounts of a liquid medium necessary to produce a total mixture having a pH from about 3.5 to about 6.5 and wherein the liquid medium constitutes from about 50 to about 90 weight percent of said total mixture and wherein the Mg[A] compound is introduced to the Al[B] compound in the form of a magnesia composition having a pH from about 3.5 to 6.5 and [A] and [B] are nonmetallic atoms which carry a net negative charge when respectively chemically bonded to the magnesia and alumina atoms and which, when subjected to prolonged heating in the presence of oxygen at elevated temperatures of calcination, will form gaseous oxides of the nonmetallic atoms of [A] and [B];
  (2) spray drying the total mixture under such conditions that: (i) the liquid medium is flashed to a gaseous state at such a rate as to arrest migration of the magnesia and the alumina through the liquid medium, (ii) segregation of the magnesia and the alumina into discrete enclaves within a resulting synthetic spinel is precluded and (iii) finely divided, solid, particles are obtained wherein the starting ratio of magnesium atoms to aluminum atoms of the total mixture is substantially maintained in said particles; and
  (3) calcining the finely divided, solid, particles under conditions which produce crystals of a solid solution of magnesium oxide (MgO) and aluminum oxide ($Al_2O_3$) having a range of molecular ratios of MgO to $Al_2O_3$ from about 1.0 to about 2.5 and drive off, as gases, substantially all other elements present in the crystal (i.e., other than those elements contained in the MgO and in the $Al_2O_3$) and thereby producing a synthetic spinel which contains no more than about 5% by weight complex compounds of magnesium and aluminum.

15. The process of claim 14 wherein the anhydrous particles are substantially free of discernable complex compounds of magnesium and aluminum.

16. The process of claim 14 which further comprises desiccating the particles obtained from the spray drying at temperatures substantially higher than the boiling point of the liquid medium for a period of from about 0.2 hours to about 24.0 hours in order to remove any residual amounts of the liquid medium and thereby obtaining, in the form of a powder, anhydrous particles which still maintain the starting ratio of magnesium atoms to aluminum atoms.

17. The process of claim 14 wherein the nonmetallic atoms [A] and [B] are each covalently linked combinations of nonmetallic atoms and wherein (i) the magnesia compound is selected from the group consisting of magnesium nitrate, magnesium acetate, magnesium oxide, magnesium hydroxide, magnesium hydroxynitrate, magnesium hydroxyacetate, magnesium ethylate and (ii) the alumina compound is selected from the group consisting of aluminum nitrate, aluminum hydroxyacetate, aluminum acetate, aluminum hydroxide and aluminum oxide, and (iii) the liquid medium is selected from the group consisting of water, alcohols having less than twenty carbon atoms, ether and acetone.

18. The process of claim 14 wherein additional amounts of a liquid medium are added in order to bring the liquid medium of the total mixture to the 50 to 90 weight percent.

19. The process of claim 14 wherein a composition containing a compound .$R^{2+}$[C] and a composition containing a compound .$R^{3+}$[D] are mixed with the magnesia and alumina compositions in order to form a spinel having a crystalline lattice wherein a portion of magnesium atoms are replaced by .$R^{2+}$ atoms and a portion of the aluminum atoms are replaced by .$R^{3+}$ atoms 20. The process of claim 14 wherein a composition containing a cerium compound Ce[E] is mixed with the magnesia and alumina compounds as part of the total mixture.

21. The process of claim 14 wherein a composition containing a vanadium compound V[E] is mixed with the magnesia and alumina compounds as part of the total mixture.

22. The process of claim 14 wherein the magnesia composition is a magnesium acetate solution having a pH of about 4.0 and the alumina composition is an alumina sol whose alumina particles have average diameters of about 2 nanometers and which are dispersed through the use of an acid selected from the group consisting of acetic acid and nitric acid.

23. The process of claim 14 wherein the calcining is carried out in a temperature range between about 1,000 degrees Fahrenheit and about 1,950 degrees Fahrenheit for from about 60 minutes to about 240 minutes.

24. The process of claim 14 wherein a gas evolution agent is added to the total mixture before said mixture undergoes spray drying.

25. The process of claim 14 wherein a viscosity agent selected from the group consisting of starch and gum arabic are added to the total mixture before it undergoes spray drying.

26. The process of claim 14 which further comprises establishing that the synthetic spinel is free of complex compounds of magnesium and complex compounds of aluminum by noting the results of test criteria selected from the group consisting of: (i) the occurrence in an x-ray diffraction test of a single angular peak for the value of a $R^{2+}/R^{3+}$ ratio corresponding to continuous linear variation, (ii) an exceeding of a value of standard deviation of micro-quantitative analyses and (iii) a change in temperature to indicate the occurrence of a chemical reaction.

27. A spinel having the general formula $R^{2+}O.R^{3+}O_3$, made by a process comprising:
   (1) mixing, to a homogeneous consistency: (i) a composition of $R^{2+}[A]$ ("the $R^{2+}[A]$ composition") having a $R^{2+}[A]$ compound whose chemical particles are in a size range from molecular size to particles having average diameters not greater than about 5 nanometers, (ii) a composition $R^{3+}[B]$ ("the $R^{3+}[B]$ composition") having a $R^{3+}[B]$ compound whose chemical particles are also in a size range from molecular size to particles having average diameters not greater than about 5 nanometers, and mixed such that the starting ratio of $R^{2+}$ atoms to $R^{3+}$ atoms is from about 0.5 to about 1.25 and (iii) such amounts of a liquid medium necessary to produce a total mixture having a pH from about 3.5 to about 6.5 and wherein the liquid medium constitutes from about 50 to about 90 weight percent of said total mixture and wherein (i) $R^{2+}$ is a first metallic atom having a first, positive, oxidation state, (ii) $R^{3+}$ is a second metallic atom having a second, positive, oxidation state higher than the first positive oxidation state of the first metallic atom and (iii) the $R^{2+}[A]$ compound is introduced to the $R^{3+}[B]$ compound in the form of a $R^{2+}[A]$ composition having a pH from about 3.5 to about 6.5 and [A] and [B] are nonmetallic atoms which carry a net negative charge when respectively chemically bonded to the $R^{2+}$ and $R^{3+}$ metallic atoms and which, when subjected to prolonged heating in the presence of oxygen at elevated temperatures of calcination, will form gaseous oxides of the nonmetallic atoms of [A] and [B];
   (2) spray drying the total mixture under conditions such that: (i) the liquid medium is flashed to a gaseous state at such a rate as to arrest migration of the $R^{2+}A]$ compound and the $R^{3+}[B]$ compound through the liquid medium, (ii) segregation of the $R^{2+}[A]$ compound and the $R^{3+}[B]$ compound into discrete enclaves within a resulting synthetic spinel is precluded, (iii) finely divided, solid, particles are obtained wherein the starting ratio of $R^{2+}$ atoms to $R^{3+}$ atoms of the total mixture is substantially maintained in said particles; and
   (3) calcining the finely divided, solid, particles under conditions which produce crystals of a solid solution of $R^{2+}$ oxide ($R^{3+}O$) and $R^{3+}$ oxide ($R_2^{3+}O_3$) having a range of molecular ratios of $R^{3+}O$ to $R_2^{3+}O_3$) from about 1.0 to about 2.5 and drive off, as gases, substantially all other elements present in the crystal (i.e., other than those elements contained in the $R^{2+}O$ and in the and thereby producing a synthetic spinel which contains no more than about 5% by weight complex compounds of $R^{2+}$ and $R^{3+}$.

28. The spinel of claim 27 made by a process which further comprises adjusting the pH of the total reaction mixture by use of an acid.

29. The spinel of claim 27 made by a process which further comprises desiccating the particles obtained from the spray drying at temperatures substantially higher than the boiling point of the liquid medium in order to remove any residual amounts of the liquid medium and thereby obtaining, in the form of a powder, anhydrous particles which still maintain the starting ratio of $R^{2+}$ atoms to $R^{3+}$ atoms.

30. The spinel of claim 27 made by a process which further comprises use of non-metallic elements [A] and [B] which are each covalently linked combinations of nonmetallic atoms and wherein $R^{2+}$ is a metal selected from the group consisting of magnesium, zinc, iron and manganese, $R^{3+}$ is a metal selected from the group consisting of aluminum, iron, cerium, manganese, lanthanum, and chromium, [A] is a combination of nonmetallic atoms selected from the group consisting of nitrate, acetate ethylate, alkoxide, and [B] is a combination of non-metallic atoms selected from the group consisting of nitrate, acetate, oxide, chromate, alkoxide and hydroxide.

31. The spinel of claim 27 made by a process which further comprises use of a composition containing a .$R^{2+}[C]$ compound which is mixed with the $R^{2+}[A]$ and $R^{3+}[D]$ compositions in order to form a spinel having a crystalline lattice wherein a portion of the $R^{2+}$atoms are replaced by .$R^{2+}$atoms.

32. The spinel of claim 27 made by a process which further comprises use of a compound .$R^{2+}[C]$ and a compound .$R^{3+}[D]$ which are mixed with the $R^{2+}[A]$ and $R^{3+}[B]$ compounds in order to form a spinel having a crystalline lattice wherein a portion of the $R^{2+}$ atoms are replaced by .$R^{2+}$ atoms and a portion of the $R^{3+}$ atoms are replaced by .$R^{3+}$ atoms.

33. The spinel of claim 27 made by a process which further comprises use of a composition containing a cerium compound Ce[E] which is mixed with the $R^{2+}[A]$ and $R^{3+}B]$ compositions as part of the total mixture.

34. The spinel of claim 27 made by a process which further comprises use of a composition containing a vanadium compound V[E] which is mixed with the $R^{2+}[A]$ and $R^{3+}[B]$ compositions as part of the total mixture.

35. The spinel of claim 27 made by a process which further comprises use of a $R^{2+}[A]$ composition which is a magnesium acetate solution having a pH of about 4.0 and a $R^{3+}[B]$ composition which is an alumina sol whose alumina particles have average diameters of about 2 nanometers.

36. A spinel having the general formula $MgO. Al_2O_3$, made by a process comprising:
   (1) mixing, to a homogeneous consistency: (i) a composition of magnesium (Mg[A], "the magnesia")

having a Mg[A] compound whose chemical particles are in a size range from molecular size to particles having average diameters no more than about 5 nanometers, (ii) a composition of aluminum (Al[B], "the alumina") having an Al[B] compound whose chemical particles are also in a size range from molecular size to particles having average diameters no more than about 5 nanometers, and mixed such that the starting ratio of magnesium atoms to aluminum atoms is substantially from 0.5 to 1.25 and (iii) such amounts of a liquid medium necessary to produce a total mixture having a pH from about 3.5 to about 6.5 and wherein the liquid medium constitutes from about 50 to about 90 weight percent of said total mixture and wherein the Mg[A] compound is introduced to the Al[B] compound in the form of a magnesia composition having a pH from about 3.5 to about 6.5 and [A] and [B] are each nonmetallic elements which bear a net negative charge when respectively chemically bonded to the magnesia and alumina atoms and which, when subjected to prolonged heating in the presence of oxygen at elevated temperatures of calcination, will form gaseous oxides of the nonmetallic elements of [A] and [B];

(2) spray drying the total mixture under conditions such that: (i) the liquid medium is flashed to a gaseous state at such a rate as to arrest migration of the magnesia and the alumina through the liquid medium, (ii) segregation of the magnesia and the alumina into discrete enclaves within a resulting synthetic spinel is precluded, and (iii) finely divided, solid, particles are obtained wherein the starting ratio of magnesium atoms to aluminum atoms of the total mixture is substantially maintained in said particles; and (3) calcining the finely divided, solid particles under conditions which produce crystals of a solid solution of magnesium oxide (MgO) and aluminum oxide ($Al_2O_3$) having a range of molecular ratios of MgO to $Al_2O_3$ from about 1.0 to about 2.5 and drive off, as gases, substantially all other elements present in the crystal (i.e., other than those elements contained in the MgO and in the $Al_2O_3$) and thereby producing a synthetic spinel which contains no more than about 5% by weight complex compounds of magnesium and aluminum.

37. The spinel of claim 36 which is made by a process which further comprises use of an acid to adjust the pH of the total mixture.

38. The spinel of claim 36 made by a process which further comprises desiccating the particles obtained from the spray drying at temperatures substantially higher than the boiling point of the liquid medium in order to remove any residual amounts of the liquid medium and thereby obtaining, in the form of a powder, anhydrous particles which still maintain the starting ratio of magnesium atoms to aluminum atoms.

39. The spinel of claim 36 made by a process which further comprises use of non-metallic atoms [A] and [B] which are each covalently linked combinations of nonmetallic atoms and wherein [A] is a combination of nonmetallic atoms selected from the group consisting of nitrate, acetate ethylate, hydroxynitrate, hydroxyacetate, oxide hydroxide and alkoxide and [B] is a combination of nonmetallic elements selected from the group consisting of nitrate, acetate, oxide, chromate, hydroxide, hydroxynitrate, hydroxyacetate, and alkoxide.

40. The spinel of claim 36 which shows its freedom from complex compounds of magnesium and of aluminum by test criteria selected from the group consisting of: (i) the occurrence in an x-ray diffraction test of a single angular peak for the value of a $R^{2+}/R^{3+}$ ratio corresponding to continuous linear variation, (ii) an exceeding of a value of standard deviation of microquantitative analyses and (iii) neither the release nor the absorption of energy to indicate the occurrence of a chemical reaction.

41. The spinel of claim 36 made by a process which further comprises mixing a composition containing a $R^{2+}[C]$ compound with the magnesia and the aluminum in order to form a spinel having a crystalline lattice wherein a portion of the magnesium atoms are replaced by .$R^{2+}$ atoms.

42. The spinel of claim 36 made by a process which further comprises mixing a composition containing a compound .$R^{2+}[C]$ and a composition containing a compound .$R^{3+}[D]$ with the magnesia and alumina in order to form a spinel having a crystalline lattice wherein a portion of the magnesium atoms are replaced by .$R^{2+}$ atoms and a portion of the aluminum atoms are replaced by .$R^{3+}$ atoms.

43. The spinel of claim 36 made by a process which further comprises mixing a composition containing a cerium compound Ce[E] with the magnesium and alumina compositions as part of the total mixture.

44. The spinel of claim 36 made by a process which further comprises use of a composition containing a vanadium compound V[E] which is mixed with the $R^{2+}[A]$ and $R^{3+}[B]$ compositions as part of the total mixture.

45. The spinel of claim 36 made by a process wherein the magnesia composition is a magnesium acetate solution having a pH of about 4.0 and the alumina composition is an alumina sol whose alumina particles have average diameters of about 2 nanometers.

46. The spinel of claim 36 made by a process which further comprises impregnating the spinel with a vanadium solution and then re-calcining said spinel.

47. A process for making a synthetic spinel having the general formula $R^2O.R_2^{3+}O_3$, said process comprising:
(1) mixing, to a homogeneous consistency: (i) a composition of $R^{2+}[A]$ ("the $R^{2+}O[A]$ composition") having a $R^{2+}[A]$ compound whose chemical particles are in a size range from molecular size to particles having average diameters not greater than about 5 nanometers, (ii) a composition of $R^{3+}[B]$ ("the $R^{3+}[B]$ composition") having a $R^{3+}[B]$ compound whose chemical particles are of a size greater than 5 nanometers, but less than about 60 nanometers, and which have a three dimensional crystalline lattice structure having three axes wherein the crystalline lattice structure having three axes has lattice spacings which are unequal along at least two of the three axes, and which can be broken down into particles having ultimate crystallite sizes of less than about 5 nanometers by physico-chemical forces applied during a mixing step of said process, and mixed such that the starting ratio of $R^{2+}$ atoms to $R^{3+}$ atoms is from about 0.5 to about 1.25 and (iii) such amounts of a liquid medium necessary to produce a total mixture having a pH from about 3.5 to about 6.5 and wherein the liquid medium is capable of breaking down particles of $R^{3+}[B]$ compound to ultimate crystallite sizes of less than 5 nanometers and which constitutes from about 50 to about 90 weight percent of said total mixture and wherein: (i) $R^{2+}$ is a first metallic atom having a first, positive, oxidation state, (ii) $R^{3+}$ is a second metallic atom having a second, positive, oxidation state higher than the first positive oxidation state of the first metallic atom, and (iii) the $R^{2+}$[A] compound is introduced to the $R^{3+}$[B] compound in the form of a $R^{2+}$[A] composition having a pH from about 3.5 to about 6.5 and [A] and [B] are comprised of nonmetallic atoms which carry a net negative charge when they are, respectively, chemically bonded to the $R^{2+}$ and $R^{3+}$ metallic atoms and which, when subjected to prolonged heating in the presence of oxygen at elevated temperatures of calcination, will form gaseous oxides of the nonmetallic atoms of [A] and [B];

(2) spray-drying the total mixture under conditions such that: (i) the liquid medium is flashed to a gaseous state at such a rate as to arrest migration of the $R^{2+}$[A] compound and the $R^{3+}$[B] compound through the liquid medium, (ii) segregation of the $R^{2+}$[A] compound and the $R^{3+}$[B] compound into discrete enclaves within a resulting synthetic spinel is precluded and (iii) finely divided, solid, particles are obtained wherein the starting ratio of $R^{2+}$ atoms to $R^{3+}$ atoms of the total mixture is substantially maintained in said particles; and (3) calcining the finely divided, solid, particles under conditions which produce crystals of a solid solution of $R^{2+}$ oxide ($R^{2+}$O) and $R^{3+}$ oxide ($R_2^{3+}O_3$) having a range of molecular ratios of $R^{2+}$O to $R_2^{3+}O_3$ from about 1.0 to about 2.5 and drive off, as gases, substantially all other elements present in the crystal (i.e., other than those elements contained in the $R^{2+}$O and in the and thereby producing a synthetic spinel which contains no more than about 5% by weight complex compounds of $R^{2+}$ and $R^{3+}$.

48. The process of claim 47 which further comprises desiccating the particles resulting from the spray drying at a temperature higher than the boiling point of the liquid medium for a period from about 0.2 hours to about 24.0 hours in order to remove any residual amounts of the liquid medium and thereby obtaining, in the form of a powder, anhydrous particles which still maintain the starting ratio of $R^{2+}$ atoms to $R^{R3+}$ atoms.

49. The process of claim 47 wherein the non-metallic atoms [A] and [B] are each covalently linked combinations of nonmetallic atoms; and wherein $R^{2+}$ is a metal selected from the group consisting of magnesium, zinc, iron and manganese, $R^{3+}$ is a metal selected from the group consisting of aluminum, iron, cerium, manganese and lanthanum, [A] is a combination of nonmetallic atoms selected from the group consisting of nitrate, acetate ethylate, alkoxide, [B] is a combination of nonmetallic atoms selected from the group consisting of nitrate, oxide, acetate, chromate, hydroxide and alkoxide and the liquid medium is selected from the group consisting of water, alcohols having carbon chains containing up to 20 carbon atoms, acetone and ether.

50. The process of claim 47 wherein the $R^{2+}$[A] compound is a magnesium acetate solution having a pH of about 4.0 and the $R^{3+}$[B] compound is an alumina sol whose alumina particles have ultimate crystallite sizes having average diameters of about 2 nanometers and which are dispersed through the use of an acid selected from the group consisting acetic acid and nitric acid.

51. The process of claim 47 wherein a composition containing a compound .$R^{2+}$[C] is mixed with the $R^{2+}$[A] and $R^{3+}$[B] compositions in order to form a spinel having a crystalline lattice wherein a portion of $R^{2+}$ atoms are replaced by atoms.

52. The process of claim 47 wherein a composition containing a cerium compound Ce[E] is mixed with the $R^{2+}$[A] and $R^{3+}$[B] compositions as part of the total mixture.

53. The process of claim 47 wherein a composition containing a vanadium compound V[E] is mixed with the $R^{2+}$[A] and $R^{3+}$[B] compositions as part of the total mixture.

54. The process of claim 47 wherein the calcining is carried out in a temperature range between about 1,000 degrees Fahrenheit and about 1,950 degrees Fahrenheit for from about 60 minutes to about 240 minutes.

55. The process of claim 47 wherein additional amounts of a liquid medium are added in order to bring the liquid medium of the total mixture to the 50 to 90 weight percent.

56. The process of claim 47 wherein production of the total mixture is accompanied by a vigorous mixing action to promote a uniform distribution of the $R^{2+}$[A] and $R^{3+}$[B] compositions in the total mixture and to promote formation of ultimate crystallite sizes of the $R^{2+}$[A] and $R^{3+}$[B] compounds.

57. The process of claim 47 wherein a gas evolution agent is added to the total mixture before said mixture undergoes spray drying.

58. The process of claim 47 wherein a viscosity agent selected from the group consisting of starch and gum arabic is added to the total mixture before it undergoes spray drying.

59. The process of claim 47 wherein the pH of the total reaction mixture is adjusted by the use of an acid.

60. A process for making a synthetic spinel having the general formula Mg O.Al$_2$O$_3$, said process comprising:

(1) mixing, to a homogeneous consistency: (i) a liquid composition of magnesium (Mg[A], "the magnesia") having a Mg[A] compound whose chemical particles are in a size greater than 5 nanometers, but less than about 60 nanometers, and which have a three dimensional crystalline lattice structure having three axes wherein the crystalline lattice structure having three axes has lattice spacings which are unequal along at least two of the three axes, and which can be broken down into particles having ultimate crystallite sizes of less than about 5 nanometers by physico-chemical forces applied during a mixing step of said process, (ii) a liquid composition of aluminum (Al[B], "the alumina") having an Al[B] compound whose chemical particles are also in a size greater than 5 nanometers, but less than about 60 nanometers, and which have a three dimensional crystalline lattice structure having three axes wherein the crystalline lattice structure having three axes has lattice spacings which are unequal along at least two of the three axes, and which can be broken down into particles having ultimate crystallite sizes of less than about 5 nanometers by physico-chemical forces applied during a mixing step of said process, and mixed such that the starting ratio of magnesium atoms to aluminum atoms is substantially from 0.5 to 1.25 and (iii) such amounts of a liquid medium necessary to produce a total mixture having a pH from about 3.5 to about 6.5 and wherein the liquid medium is capable of breaking down the particles of the $R^{2+}[A]$ compound and the $R^{3+}[B]$ compound to their respective ultimate crystallite sizes and which constitutes from about 50 to about 90 weight percent of said total mixture and wherein the Mg[A] compound is introduced to the Al[B] compound in the form of a magnesia composition having a pH from about 3.5 to 6.5 and [A] and [B] are nonmetallic atoms which carry a net negative charge when respectively chemically bonded to the magnesia and alumina atoms and which, when subjected to prolonged heating in the presence of oxygen at elevated temperatures of calcination, will form gaseous oxides of the nonmetallic atoms of [A] and [B];

(2) spray drying the total mixture under such conditions that: (i) the liquid medium is flashed to a gaseous state at such a rate as to arrest migration of the magnesia and the alumina through the liquid medium, (ii) segregation of the magnesia and the alumina into discrete enclaves within a resulting synthetic spinel is precluded and (iii) finely divided, solid, particles are obtained wherein the starting ratio of magnesium atoms to aluminum atoms of the total mixture is substantially maintained in said particles; and (3) calcining the finely divided, solid, particles under conditions which produce crystals of a solid solution of magnesium oxide (MgO) and aluminum oxide ($Al_2O_3$) having a range of molecular ratios of MgO to $Al_2O_3$ from about 1.0 to about 2.5 and drive off, as gases, substantially all other elements present in the crystal (i.e., other than those elements contained in the MgO and in the $Al_2O_3$) and thereby producing a synthetic spinel which contains no more than about 5% by weight complex compounds of magnesium and aluminum.

61. The process of claim 60 wherein the anhydrous particles are substantially free of discernable complex compounds of magnesium and aluminum.

62. The process of claim 60 which further comprises desiccating the particles obtained from the spray drying at temperatures substantially higher than the boiling point of the liquid medium for a period of from about 0.2 hours to about 24.0 hours in order to remove any residual amounts of the liquid medium and thereby obtaining, in the form of a powder, anhydrous particles which still maintain the starting ratio of magnesium atoms to aluminum atoms.

63. The process of claim 60 wherein the nonmetallic atoms [A] and [B] are each covalently linked combinations of nonmetallic atoms and wherein (i) the magnesia compound is selected from the group consisting of magnesium nitrate, magnesium acetate, magnesium oxide, magnesium hydroxide, magnesium hydroxynitrate, magnesium hydroxyacetate, magnesium oxide, magnesium hydroxide, magnesium hydroxynitrate, magnesium hydroxyacetate, magnesium ethylate and (ii) the alumina compound is selected from the group consisting of aluminum nitrate, aluminum hydroxynitrate aluminum hydroxyacetate, aluminum acetate, aluminum hydroxide and aluminum oxide, and (iii) the liquid medium is selected from the group consisting of water, alcohols having less than twenty carbon atoms, ether and acetone.

64. The process of claim 60 wherein additional amounts of a liquid medium are added in order to bring the liquid medium of the total mixture to the 50 to 90 weight percent.

65. The process of claim 60 wherein a composition containing a compound $.R^{2+}[C]$ and a composition containing a compound $.R^{3+}[D]$ are mixed with the magnesia and alumina compositions in order to form a spinel having a crystalline lattice wherein a portion of magnesium atoms are replaced by $R^{2+}$ atoms and a portion of the aluminum atoms are replaced by $R^{3+}$ atoms.

66. The process of claim 60 wherein a composition containing a cerium compound Ce[E] is mixed with the magnesia and alumina compounds as part of the total mixture.

67. The process of claim 60 wherein a composition containing a vanadium compound V[E] is mixed with the magnesia and alumina compounds as part of the total mixture.

68. The process of claim 60 wherein the magnesia composition is a magnesium acetate solution having a pH of about 4.0 and the alumina composition is an alumina sol whose alumina particles are obtained from ores selected from the group consisting of boehmite and psuedo-boehmite and have average diameters of up to about 60 nanometers and which are dispersed through the use of an acid selected from the group consisting of an acid selected from the group consisting of acetic acid and nitric acid.

69. The process of claim 60 wherein the calcining is carried out in a temperature range between about 1,000 degrees Fahrenheit and about 1,950 degrees Fahrenheit for from about 60 minutes to about 240 minutes.

70. The process of claim 60 wherein a gas evolution agent is added to the total mixture before said mixture undergoes spray drying.

71. The process of claim 60 wherein a viscosity agent selected from the group consisting of starch and gum arabic are added to the total mixture before it undergoes spray drying.

72. The process of claim 60 which further comprises establishing that the synthetic spinel is free of complex compounds of magnesium and complex compounds of aluminum by noting the results of test criteria selected from the group consisting of: (i) the occurrence in an x-ray diffraction test of a single angular peak for the value of a $R^{2+}/R^{3+}$ ratio corresponding to continuous linear variation, (ii) an exceeding of a value of standard deviation of micro-quantitative analyses and (iii) a change in temperature to indicate the occurrence of a chemical reaction.

73. A spinel having the general formula $R^{2+}O.R^{3+}_2O_3$, made by a process comprising:

(1) mixing, to a homogeneous consistency: (i) a composition of $R^{2+}[A]$ ("the $R^{2+}[A]$ composition") having a $R^{2+}[A]$ compound whose chemical particles are in a size range from molecular size to particles having average diameters not greater than about 5 nanometers, (ii) a composition $R^{3+}[B]$ ("the $R^{3+}[B]$ composition") having a $R^{3+}[B]$ compound whose chemical particles are of a size greater than 5 nanometers, but less than about 60 nanometers, and which have a three dimensional crystalline lattice structure having three axes wherein the crystalline lattice structure having three axes has lattice spacings which are unequal along at least two of the three axes, and which can be broken down into particles having ultimate crystallite sizes of less than about 5 nanometers, and mixed such that the starting ratio of $R^{2+}$ atoms to $R^{3+}$ atoms is from about 0.5 to about 1.25 and (iii) such amounts of a liquid medium necessary to produce a total mixture having a pH from about 3.5 to about 6.5 and wherein the liquid medium is capable of breaking down the particles of the $R^{3+}[B]$ compound to ultimate crystallite sizes of less than 5 nanometers and which constitutes from about 50 to about 90 weight percent of said total mixture and wherein (i) $R^{2+}$ is a first metallic atom having a first, positive, oxidation state, (ii) $R^{3+}$ is a second metallic atom having a second, positive, oxidation state higher than the first positive oxidation state of the first metallic atom and (iii) the $R^{2+}[A]$ compound is introduced to the $R^{3+}[B]$ compound in the form of a $R^{2+}[A]$ composition having a pH from about 3.5 to about 6.5 and [A] and [B] are nonmetallic atoms which carry a net negative charge when respectively chemically bonded to the $R^{2+}$ and $R^{3+}$ metallic atoms and which, when subjected to prolonged heating in the presence of oxygen at elevated temperatures of calcination, will form gaseous oxides of the nonmetallic atoms of [A] and [B];

(2) spray drying the total mixture under conditions such that: (i) the liquid medium is flashed to a gaseous state at such a rate as to arrest migration of the $R^{2+}[A]$ compound and the $R^{3+}[B]$ compound through the liquid medium, (ii) segregation of the $R^{2+}[A]$ compound and the $R^{3+}[B]$ compound into discrete enclaves within a resulting synthetic spinel is precluded, (iii) finely divided, solid, particles are obtained, and (iv) wherein the starting ratio of $R^{2+}$ atoms to atoms of the total mixture is substantially maintained in said particles; and (3) calcining the finely divided, solid, particles under conditions which produce crystals of a solid solution of $R^{2+}$ oxide ($R^{2+}O$) and $R^{3+}$ oxide ($R_2^{3+}O_3$) having a range of molecular ratios of $R^{2+}O$ to ($R_2^{3+}O_3$) from about 1.0 to about 2.5 and drive off, as gases, substantially all other elements present in the crystal (i.e., other than those elements contained in the $R^{2+}O$ and in the $R_2^{3+}O_3$) and thereby producing a synthetic spinel which contains no more than about 5% by weight complex compounds of $R^{2+}$ and $R^{3+}$.

74. The spinel of claim 73 made by a process which further comprises adjusting the pH of the total reaction mixture by use of an acid.

75. The spinel of claim 73 made by a process which further comprises desiccating the particles obtained from the spray drying at temperatures substantially higher than the boiling point of the liquid medium in order to remove any residual amounts of the liquid medium and thereby obtaining, in the form of a powder, anhydrous particles which still maintain the starting ratio of $R^{2+}$ atoms to $R^{3+}$ atoms.

76. The spinel of claim 73 made by a process which further comprises use of non-metallic elements [A] and [B] which are each covalently linked combinations of nonmetallic atoms and wherein $R^{2+}$ is a metal selected from the group consisting of magnesium, zinc, iron and manganese, $R^{3+}$ is a metal selected from the group consisting of aluminum, iron, cerium, manganese and lanthanum, [A] is a combination of nonmetallic atoms selected from the group consisting of nitrate, acetate ethylate, alkoxide, and [B] is a combination of non-metallic atoms selected from the group consisting of nitrate, acetate, oxide, chromate, alkoxide and hydroxide.

77. The spinel of claim 73 made by a process which further comprises use of a composition containing a $.R^{2+}[C]$ compound which is mixed with the $R^{2+}[A]$ and $R^{3+}[D]$ compositions in order to form a spinel having a crystalline lattice wherein a portion of the $R^{2+}$ atoms are replaced by $.R^{2+}$ atoms.

78. The spinel of claim 73 made by a process which further comprises use of a compound $.R^{2+}[C]$ and a compound $.R^{3+}[D]$ which are mixed with the $R^{2+}[A]$ and $R^{3+}[B]$ compounds in order to form a spinel having a crystalline lattice wherein a portion of the $R^{2+}$ atoms are replaced by $R^{2+}$ atoms and a portion of the $R^{3+}$ atoms are replaced by $.R^{3+}$ atoms.

79. The spinel of claim 73 made by a process which further comprises use of a composition containing a cerium compound Ce[E] which is mixed with the $R^{2+}[A]$ and $R^{3+}[B]$ compositions as part of the total mixture.

80. The spinel of claim 73 made by a process which further comprises use of a composition containing a vanadium compound V[E] which is mixed with the $R^{2+}[A]$ and $R^{3+}[B]$ compositions as part of the total mixture.

81. The spinel of claim 73 made by a process which further comprises use of a $R^{2+}[A]$ composition which is a magnesium acetate solution having a pH of about 4.0 and a $R^{3+}[B]$ composition which is an alumina sol whose alumina particles have ultimate crystallite sizes having average diameters of about 2 nanometers.

82. A spinel having the general formula $MgO \cdot Al_2O_3$, made by a process comprising:

(1) mixing, to a homogeneous consistency: (i) a composition of magnesium (Mg[A], "the magnesia") having a Mg[A] compound whose chemical particles are in a size greater than 5 nanometers, but less than about 60 nanometers, and which have a three dimensional crystalline lattice structure having three axes wherein the crystalline lattice structure having three axes has lattice spacings which are unequal along at least two of the three axes, and which can be broken down into particles having ultimate crystallite sizes of less than about 5 nanometers by physicochemical forces applied during a mixing step of said process, (ii) a composition of aluminum (Al[B], "the alumina") having an Al[B] compound whose chemical particles are also in a size greater than 5 nanometers, but less than about 60 nanometers, and which have a three dimensional crystalline lattice structure having three axes wherein the crystalline lattice structure having three axes has lattice spacings which are unequal along at least to of the three axes, and which can be broken down into particles having ultimate crystallite sizes of less than about 5 nanometers, and mixed such that the starting ratio of magnesium atoms to aluminum atoms is substantially from 0.5 to 1.25 and (iii) such amounts of a liquid medium necessary to produce a total mixture having a pH from about 3.5 to about 6.5 and wherein the liquid medium is capable of breaking down the particles of the $R^{2+}[A]$ compound and the $R^{3+}[B]$ compound to their respective ultimate crystallite sizes and which constitutes from about 50 to about 90 weight percent of said total mixture and wherein the Mg[A] compound is introduced to the Al[B] compound in the form of a magnesia composition having a pH from about 3.5 to about 6.5 and [A] and [B] are nonmetallic atoms which bear a net negative charge when respectively chemically bonded to the magnesia and alumina atoms and which, when subjected to prolonged heating in the presence of oxygen at elevated temperatures of calcination, will form gaseous oxides of the nonmetallic elements of [A] and [B];

(2) spray drying the total mixture under conditions such that: (i) the liquid medium is flashed to a gaseous state at such a rate as to arrest migration of the magnesia and the alumina through the liquid medium, (ii) segregation of the magnesia and the alumina into discrete enclaves within a resulting synthetic spinel is precluded and (iii) finely divided, solid, particles are obtained wherein the starting ratio of magnesium atoms to aluminum atoms of the total mixture is substantially maintained in said particles; and (3) calcining the finely divided, solid, particles under conditions which produce crystals of a solid solution of magnesium oxide (MgO) and aluminum oxide ($Al_2O_3$) having a range of molecular ratios of MgO to $Al_2O_3$ from about 1.0 to about 2.5 and drive off, as gases, substantially all other elements present in the crystal (i.e., other than those elements contained in the MgO and in the $Al_2O_3$) and thereby producing a synthetic spinel which contains no more than about 5% by weight complex compounds of magnesium and aluminum.

83. The spinel of claim 82 which is made by a process which further comprises use of an acid to adjust the pH of the total mixture.

84. The spinel of claim 82 made by a process which further comprises desiccating the particles obtained from the spray drying at temperatures substantially higher than the boiling point of the liquid medium in order to remove any residual amounts of the liquid medium and thereby obtaining, in the form of a powder, anhydrous particles which still maintain the starting ratio of magnesium atoms to aluminum atoms.

85. The spinel of claim 82 made by a process which further comprises use of non-metallic atoms [A] and [B] which are each covalently linked combinations of non-metallic atoms and wherein [A] is a combination of nonmetallic atoms selected from the group consisting of nitrate, acetate ethylate, hydroxynitrate, hydroxyacetate, oxide hydroxide and alkoxide and [B] is a combination of nonmetallic elements selected from the group consisting of nitrate, hydroxynitrate, hydroxyacetate, acetate, oxide, chromate, hydroxide, hydroxynitrate, hydroxyacetate, and alkoxide.

86. The spinel of claim 82 which shows its freedom from complex compounds of magnesium and of aluminum by test criteria selected from the group consisting of: (i) the occurrence in an x-ray diffraction test of a single angular peak for the value of a $R^{2+}/R^{3+}$ ratio corresponding to continuous linear variation, (ii) an exceeding of a value of standard deviation of microquantitative analyses and (iii) neither the release nor the absorption of energy to indicate the occurrence of a chemical reaction.

87. The spinel of claim 82 made by a process which further comprises mixing a composition containing a $.R^{3+}[C]$ compound with the magnesia and the aluminum in order to form a spinel having a crystalline lattice wherein a portion of the magnesium atoms are replaced by $.R^{2+}$ atoms.

88. The spinel of claim 82 made by a process which further comprises mixing a composition containing a compound $.R^{2+}[C]$ and a composition containing a compound $.R^{3+}[D]$ with the magnesia and alumina in order to form a spinel having a crystalline lattice wherein a portion of the magnesium atoms are replaced by $.R^{2+}$ atoms and a portion of the aluminum atoms are replaced by $.R^{3+}$ atoms.

89. The spinel of claim 82 made by a process which further comprises mixing a composition containing a cerium compound Ce[E] with the magnesia and alumina compositions as part of the total mixture.

90. The spinel of claim 82 made by a process which further comprises use of a composition containing a vanadium compound V[E] which is mixed with the $R^{2+}[A]$ and $R^{3+}[B]$ compositions as part of the total mixture.

91. The spinel of claim 82 made by a process wherein the magnesia composition is a magnesium acetate solution having a pH of about 4.0 and the alumina composition is an alumina sol whose alumina particles have ultimate crystallite sizes having average diameters of about 2 nanometers.

92. The spinel of claim 82 made by a process which further comprises impregnating the spinel with a vanadium solution and then re-calcining said spinel.

* * * * *